US012604790B2

(12) United States Patent
Homma et al.

(10) Patent No.: US 12,604,790 B2
(45) Date of Patent: Apr. 21, 2026

(54) AUTOMATIC TRAVELING METHOD, AUTOMATIC TRAVELING PROGRAM, AUTOMATIC TRAVELING SYSTEM, AND WORK VEHICLE

(71) Applicant: Yanmar Holdings Co., Ltd., Osaka (JP)

(72) Inventors: Terasu Homma, Osaka (JP); Tomohisa Kano, Osaka (JP); Hidehiro Yuki, Osaka (JP); Kohei Ota, Osaka (JP); Ryosuke Yamazaki, Osaka (JP); Masaki Akase, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 11 days.

(21) Appl. No.: 18/600,354

(22) Filed: Mar. 8, 2024

(65) Prior Publication Data

US 2024/0298563 A1      Sep. 12, 2024

(30) Foreign Application Priority Data

Mar. 10, 2023      (JP) ................................. 2023-037164

(51) Int. Cl.
| | |
|---|---|
| *A01B 69/04* | (2006.01) |
| *G05D 1/617* | (2024.01) |
| *G05D 1/648* | (2024.01) |
| *G05D 1/82* | (2024.01) |
| *G05D 107/20* | (2024.01) |

(52) U.S. Cl.
CPC ........... *A01B 69/008* (2013.01); *G05D 1/618* (2024.01); *G05D 1/6482* (2024.01); *G05D 1/82* (2024.01); *G05D 2107/21* (2024.01)

(58) Field of Classification Search
None
See application file for complete search history.

(56) References Cited

U.S. PATENT DOCUMENTS

| | | | |
|---|---|---|---|
| 10,149,468 B2 * | 12/2018 | Crinklaw | G05D 1/0274 |
| 2016/0340867 A1 | 11/2016 | Matsuzaki | |
| 2020/0359547 A1 * | 11/2020 | Sakaguchi | A01B 69/00 |

FOREIGN PATENT DOCUMENTS

| | | | | |
|---|---|---|---|---|
| BR | 112019003030 B1 * | 8/2022 | .......... | A01B 69/008 |
| CN | 114559954 A | 5/2022 | | |
| JP | 2022-183962 A | 12/2022 | | |
| WO | WO-2018044376 A1 * | 3/2018 | .......... | A01B 69/008 |

OTHER PUBLICATIONS

European Extended Search Report dated May 27, 2024, issued in EP Application No. 24159018.1.

* cited by examiner

*Primary Examiner* — Tamara L Weber
(74) *Attorney, Agent, or Firm* — NORTON ROSE FULBRIGHT US LLP

(57) ABSTRACT

The automatic traveling method includes: causing a sprayer 1 to travel automatically along a target route in a field; executing temporary stop processing; and executing stop reservation processing. The temporary stop processing is processing to stop the sprayer at a current position in a mode in which travel of the sprayer can be resumed in the case where a temporary stop condition is satisfied during automatic travel of the sprayer. The stop reservation processing is processing to cause the sprayer to travel and thereafter stop the sprayer in a state where the travel of the sprayer can be resumed in the case where a stop reservation condition is satisfied during the automatic travel of the sprayer.

13 Claims, 17 Drawing Sheets

AUTOMATIC TRAVELING METHOD, AUTOMATIC TRAVELING PROGRAM, AUTOMATIC TRAVELING SYSTEM, AND WORK VEHICLE

CROSS-REFERENCE TO RELATED APPLICATION

This application claims priority under 35 U.S.C. § 119 to Japanese Patent Application Nos. JP2023-037164, filed on Mar. 10, 2023, the entire contents of which are hereby incorporated by reference in their entireties.

TECHNICAL FIELD

The present invention relates to an automatic traveling method, an automatic traveling system, and an automatic traveling program for causing a work vehicle to travel automatically according to a target route in a work site.

BACKGROUND ART

In the related art, the following automatic traveling system has been proposed. The automatic traveling system causes a work vehicle to travel automatically according to a target route in a work site (for example, see Patent Document 1). The automatic traveling system described in the related art allows the work vehicle to travel automatically in a predetermined row order while performing predetermined work on work objects that are arranged in a plurality of rows in the work site. The work vehicle performs spraying work as the predetermined work. In the spraying work, the work vehicle sprays a spray material such as a chemical solution or water on crops (the work objects) that are planted in a field (the work site).

In the related art described above, a manipulation terminal is communicable with the work vehicle via a communication network, and can accept a work start instruction, a travel stop instruction, or the like for the work vehicle with manipulation by an operator. When acquiring the travel stop instruction from the manipulation terminal, the work vehicle stops automatic travel and stops the spraying work. Thus, the operator can stop the work vehicle even when the operator is at a position away from the work vehicle.

PRIOR ART DOCUMENT

Patent Document

Patent Document 1: Japanese Unexamined Patent Application Publication No. 2022-183962

SUMMARY OF INVENTION

Technical Problem

In the related art described above, in the case where the travel stop instruction is issued from the manipulation terminal while the work vehicle is performing the spraying work to spray the spray material such as the chemical solution in a work area of the work site, the work vehicle is stopped at a current position. Thus, for example, in order for the operator to approach the stopped work vehicle, the operator has to enter the work area where the spray material has been sprayed. This may reduce work efficiency due to the need for taking a countermeasure to eliminate exposure of the operator to the spray material.

An object of the present invention is to provide an automatic traveling method, an automatic traveling program, an automatic traveling system, and a work vehicle, each of which eliminates or minimizes a reduction in work efficiency.

Solution to Problem

An automatic traveling method according to one aspect of the present invention includes: causing a work vehicle to travel automatically along a target route in a work site; executing temporary stop processing to stop the work vehicle at a current position in a mode in which travel of the work vehicle can be resumed when a temporary stop condition is satisfied during automatic travel of the work vehicle; and executing stop reservation processing to cause the work vehicle to travel and thereafter stop the work vehicle in a state where the travel of the work vehicle can be resumed when a stop reservation condition is satisfied during the automatic travel of the work vehicle.

An automatic traveling program according to another aspect of the present invention is an automatic traveling program for causing one or more processors to execute the automatic traveling method.

An automatic traveling system according to another aspect of the present invention includes an automatic travel processing unit that causes a work vehicle to travel automatically along a target route in a work site. The automatic travel processing unit is configured to be able to execute temporary stop processing and stop reservation processing. The temporary stop processing is processing to stop the work vehicle at a current position in a mode in which travel of the work vehicle can be resumed when a temporary stop condition is satisfied during automatic travel of the work vehicle. The stop reservation processing is processing to cause the work vehicle to travel and thereafter stop the work vehicle in a state where the travel of the work vehicle can be resumed when a stop reservation condition is satisfied during the automatic travel of the work vehicle.

A work vehicle according to further another aspect of the present invention includes the automatic traveling system and a travel unit that is controlled by the automatic traveling system.

Advantageous Effects of Invention

The present invention can provide the automatic traveling method, the automatic traveling program, the automatic traveling system, and the work vehicle, each of which eliminates or minimizes a reduction in work efficiency.

DESCRIPTION OF EMBODIMENTS

Figure 1:
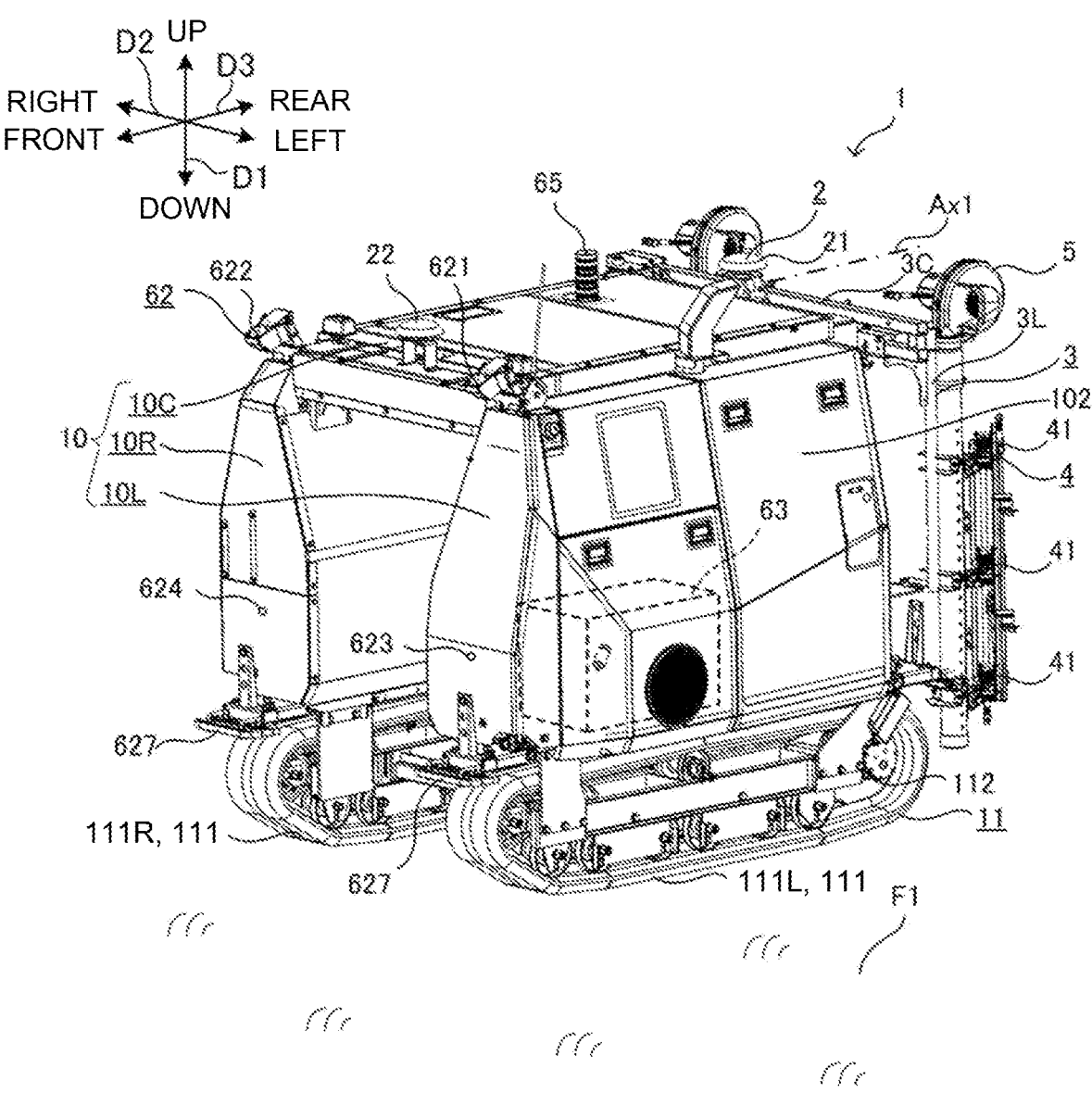
FIG. 1 is an external view in which a sprayer according to a first embodiment is seen from a front left side.

Hereinafter, embodiments of the present invention will be described with reference to the accompanying drawings. Each of the following embodiments constitutes an example that embodies the present invention, and has no intention to limit the technical scope of the present invention.

First Embodiment

[1] Overall Configuration

First, a description will be made on an overall configuration of a sprayer 1 according to the present embodiment with reference to FIG. 1 to FIG. 5. In the present embodiment, the sprayer 1 performs spraying work. In the spraying work, the sprayer 1 sprays a spray material such as a chemical solution, water, or a fertilizer on a crop V1 (see FIG. 2) that is grown in a field F1. This sprayer 1 is an example of the "work vehicle" that performs any of various works while traveling automatically along a target route in a work site such as the field F1.

That is, the sprayer 1 is a work machine that can perform, as the work, the spraying work to spray the spray material such as the chemical solution, water, or the fertilizer. Examples of the "work vehicle" described in the present disclosure include, in addition to the sprayer, a tractor, a rice transplanter, a spraying machine, a seeder, a transplanter, and a combine harvester. Furthermore, the "work vehicle" in the present disclosure is not limited to an agricultural machine (farm machinery) but may be a construction machine (construction equipment), for example.

The "field" in the present disclosure is an example of the work site where the sprayer 1, which is the work vehicle, performs any of various works such as the spraying work while moving. Examples of the "field" include, but are not limited to, an orchard, a pasture, a rice field, and a farm field, in each of which agricultural products are grown. In this case, the crop V1 grown in the field F1 is the agricultural product. Furthermore, in the case where garden trees are grown in a garden tree field, the garden tree field is the field F1. Like in forestry, in the case where trees to be used as lumber are grown in a forest, the forest is the field F1. In this case, the crop V1 that is grown in the field F1 is the garden tree, the tree, or the like. However, the work site where the work vehicle performs the work is not limited to the field F1 but may be a site other than the field F1. For example, in the case where the work vehicle is the construction machine, a site where the construction machine works is the work site.

In the present embodiment, as an example, the sprayer 1 is a vehicle that sprays the chemical solution on the crop V1 grown in the field F1 while moving in the field F1, and the field F1 is the orchard such as a vineyard or an apple orchard. In this case, the chemical solution is an example of the spray material. The crop V1 is an example of a spray target on which the spray material (the chemical solution) is sprayed. An example of the crop V1 is a grape tree. The crop V1, which is the spray target, is also an example of a work target to be worked by the sprayer 1, which is the work vehicle. The "chemical solution", which is the spray material described herein, is an agricultural chemical used for improved agricultural efficiency, preservation of the agricultural product, or any other purpose. Examples of the chemical solution include, but are not limited to, a herbicide, a fungicide, a mold inhibitor, an insecticide, a rodenticide, a growth promoter for the crop V1 and a germination inhibitor.

Figure 3:
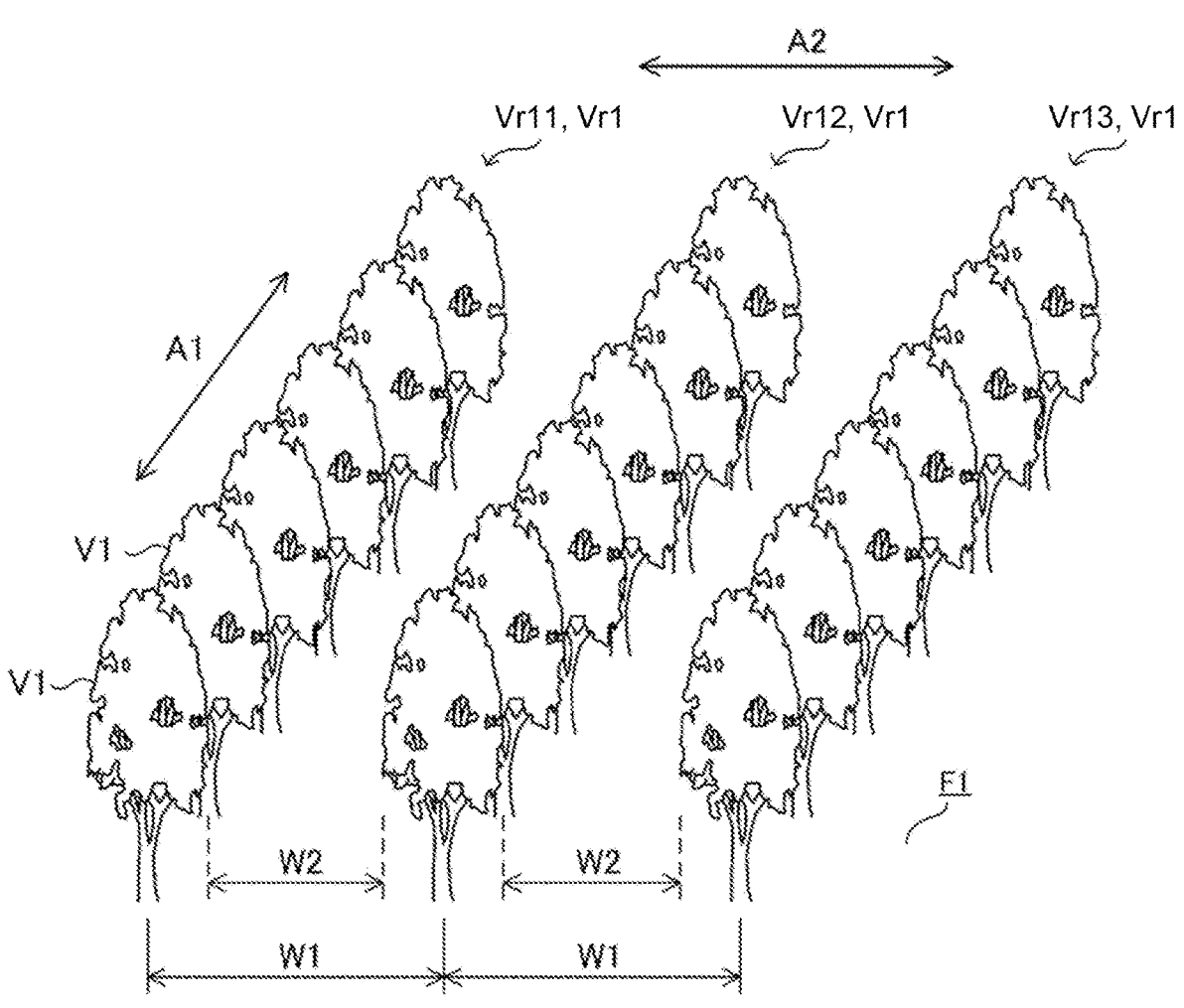
FIG. 3 is a view illustrating an example of crop rows for which the sprayer according to the first embodiment is used.

In the field F1, the crops V1 are arranged in plural rows at predetermined intervals. More specifically, as illustrated in FIG. 3, the crops V1 are planted in alignment in a length direction A1 in a plan view. The crops V1 that are aligned linearly in the length direction A1 form a crop row Vr1. FIG. 3 illustrates an example of the three crop rows Vr1, each of which includes the six crops V1 aligned in the length direction A1. The crop rows Vr1 are arranged at predetermined pitches W1 in a width direction A2. In this way, a work path is formed between the adjacent crop rows Vr1. The work path has a width W2 (<W1) that corresponds to an interval between the crop rows Vr1, and extends along the length direction A1. The sprayer 1 sprays the spray material (the chemical solution) on the crops V1 while moving (traveling) in the length direction A1 on this work path.

Although described in detail below, the sprayer 1 that travels in the field F1 includes a gate-shaped body 10. More specifically, the body 10 has: a first block 10L and a second block 10R that are aligned in a right-left direction D2; and a coupling section 10C that couples upper end portions of the first block 10L and the second block 10R. In this way, with the first block 10L, the second block 10R, and the coupling section 10C, the body 10 defines the gate shape that surrounds a left side, a right side, and an upper side of a space Sp1. That is, the space Sp1 is provided inside the body 10 and opened in a front-rear direction D3.

The sprayer 1 further includes a travel unit 11 with a pair of crawlers 111L, 111R that are aligned in the right-left direction D2. The paired crawlers 111L, 111R are provided below the first block 10L and the second block 10R, respectively, and located on both sides of the space Sp1 in the right-left direction D2.

Figure 2:
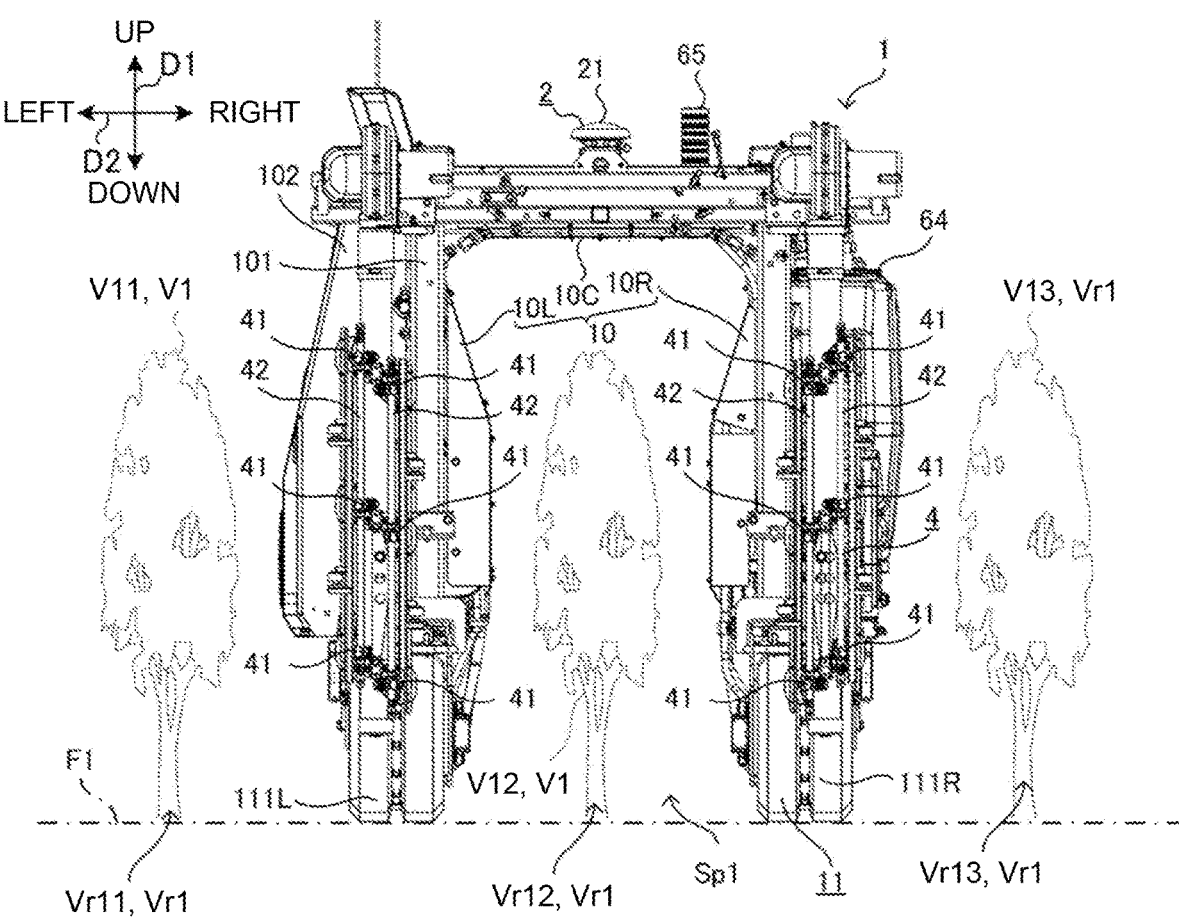
FIG. 2 is a back external view in which the sprayer according to the first embodiment is seen from a back side.

As illustrated in FIG. 2, the sprayer 1 travels in a posture that the gate-shaped body 10 straddles the single crop row Vr1. During travel of the sprayer 1, the sprayer 1 can spray the spray material (the chemical solution) on the crops V1 in the straddled crop row Vr1 and the crops V1 in the adjacent crop rows Vr1 to the straddled row Vr1. In other words, the sprayer 1 can travel in a manner to allow the crop V1, which the spray target (the work object), to pass through the space Sp1 on the inside of the gate-shaped body 10. That is, as exemplified in FIG. 2, in the case where three crops rows Vr11, Vr12, Vr13 are aligned in the right-left direction D2, the sprayer 1 can travel such that the body 10 straddles any one of these three crops rows Vr11, Vr12, Vr13.

Here, in the case where the body 10 straddles the center crop row Vr12, the first block 10L travels on the work path between the left-end crop row Vr11 and the crop row Vr12, and the second block 10R travels on the work path between the right-end crop row Vr13 and the crop row Vr12. Then, the sprayer 1 can simultaneously spray the spray material (the chemical solution) on a crop V11 in the crop row Vr11, a crop V12 in the crop row Vr12, and a crop V13 in the crop row Vr13. Just as described, during travel, the sprayer 1 can simultaneously spray the spray material (the chemical solution) on the spray targets (the crops V1) in the three rows. Thus, the sprayer 1 according to the present embodiment exhibits higher spraying work efficiency than a sprayer that is configured to spray the spray material by each row.

Figure 4:
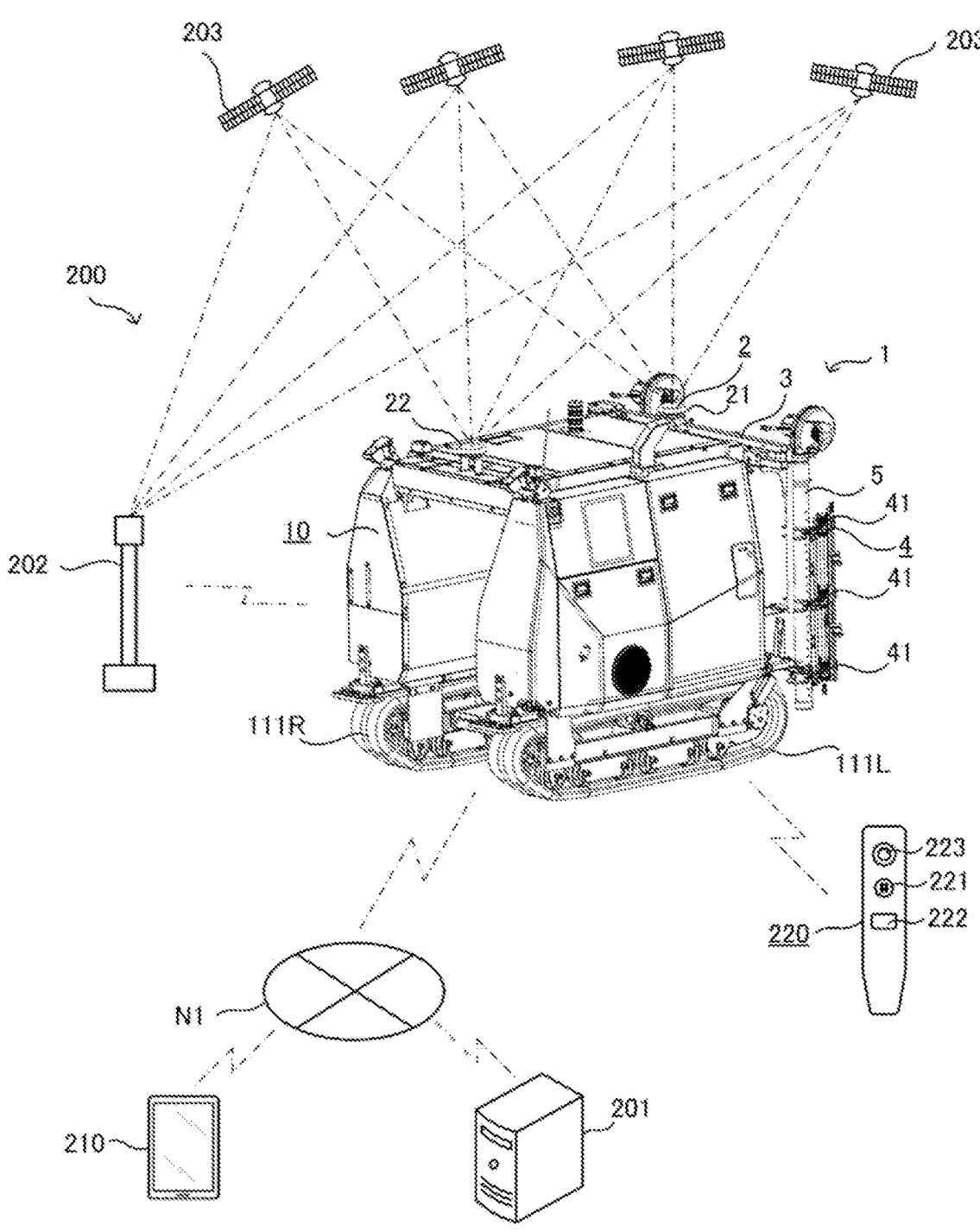
FIG. 4 is a schematic view illustrating an overall configuration of an automated work system using the sprayer according to the first embodiment.
Figure 5:
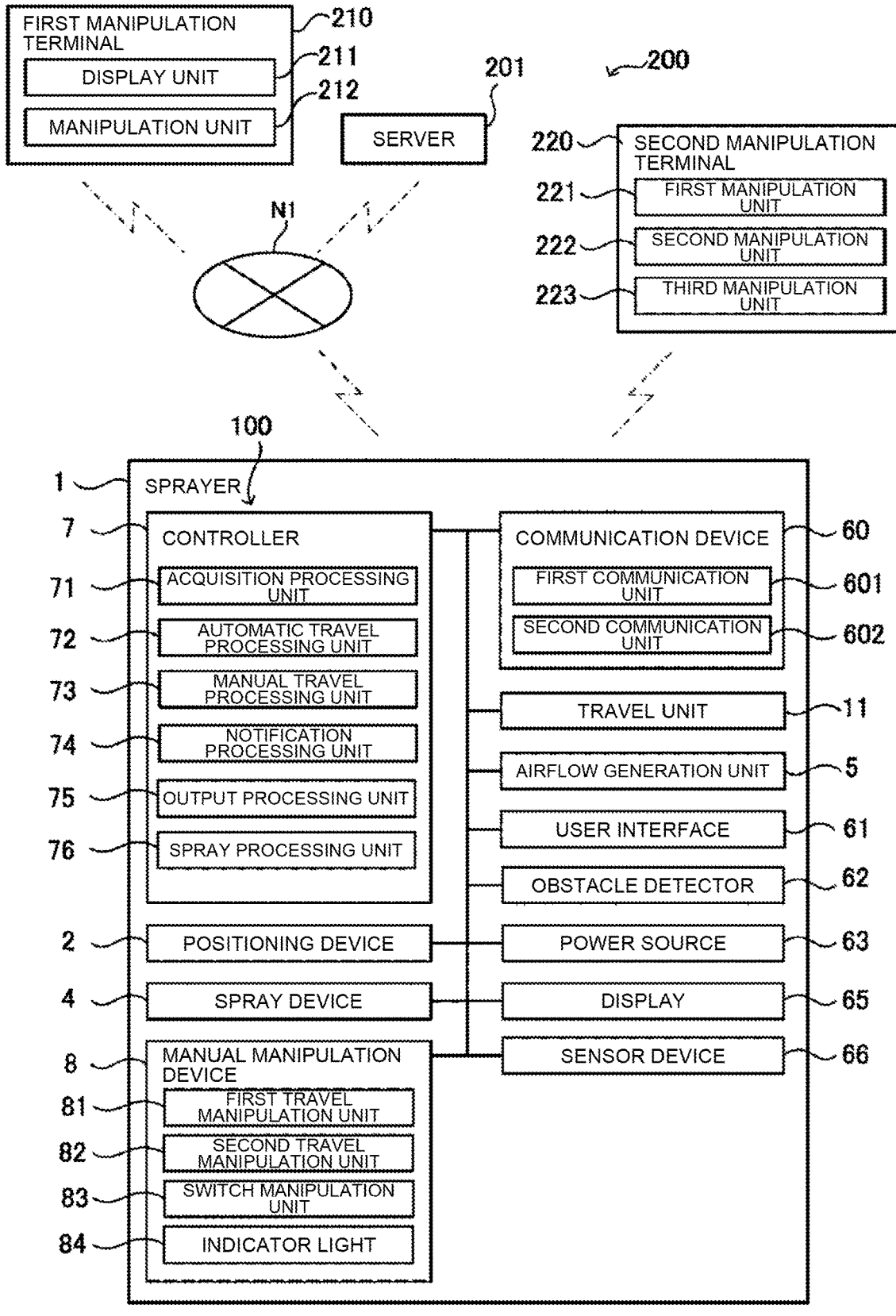
FIG. 5 is a block diagram schematically illustrating a main configuration of the automated work system according to the first embodiment.

Furthermore, as an example in the present embodiment, the sprayer 1 is an unmanned machine that is operated by automatic driving and thus does not rely on manipulation (including remote manipulation) by a person (a manipulator). For this reason, as illustrated in FIG. 4 and FIG. 5, the sprayer 1 constitutes an automated work system 200 together with a first manipulation terminal 210, a second manipulation terminal 220, a server 201, a base station 202, and a satellite 203. In other words, the automated work system 200 includes the sprayer 1, the first manipulation terminal 210, the second manipulation terminal 220, the server 201, the base station 202, and the satellite 203. However, components of the automated work system 200 may not include at least one of the first manipulation terminal 210, the second manipulation terminal 220, the server 201, the base station 202, and the satellite 203. For example, the automated work system 200 may not include the server 201, the base station 202, and the satellite 203.

The sprayer 1, the first manipulation terminal 210, the second manipulation terminal 220, and the server 201 are mutually communicable. The term "communicable" in the present disclosure means that an appropriate communication method such as wired communication or wireless communication (communication using a radio wave or light as a medium) enables information exchange either directly or indirectly via a communication network (a network) N1, a relay, or the like. For example, the sprayer 1 and the first manipulation terminal 210 are mutually communicable via the communication network N1 such as the Internet, a local area network (LAN), a wide area network (WAN), a public telephone line, a mobile telephone network, a packet network, or a wireless LAN. Here, the sprayer 1 and the first manipulation terminal 210 are each wirelessly connected to the communication network N1. Thus, the communication between the sprayer 1 and the first manipulation terminal 210 at least includes the wireless communication. In addition, the sprayer 1 and the first manipulation terminal 210 are each wirelessly communicable with the server 201 via the communication network N1.

The satellite 203 is a positioning satellite that is a component of a satellite positioning system such as a global navigation satellite system (GNSS). The satellite 203 sends a GNSS signal (a satellite signal). The base station 202 is a reference point (a reference station) that constitutes the satellite positioning system. The base station 202 sends correction information to the sprayer 1, and the correction information is then used to calculate a current position and the like of the sprayer 1.

The sprayer 1 in the present embodiment includes a positioning device 2. The positioning device 2 detects a current position (a latitude, a longitude, an altitude, and the like), a current azimuth, and the like of the body 10. The positioning device 2 executes positioning processing by using the GNSS signal that is sent from the satellite 203. In the positioning processing, the positioning device 2 identifies (calculates) the current position, the current azimuth, and the like of the body 10. The positioning device 2 employs a high-accuracy positioning method such as real-time kinematic (RTK) positioning. In the RTK positioning method, the position and the like of the body 10 are measured on the basis of positioning information (the GNSS signal or the like) received by two receivers (the base station 202 and an antenna 21) and on the basis of the correction information generated by the base station 202.

The first manipulation terminal 210 is a general-purpose information processor that can be carried by the manipulator. Examples of the first manipulation terminal 210 include, but are not limited to, a smartphone and a tablet terminal. The first manipulation terminal 210 enables the remote manipulation of the sprayer 1 as follows. In response to the manipulator's manipulation, the first manipulation terminal 210 outputs (sends), to the sprayer 1, a stop instruction (a temporary stop instruction) that at least stops the automatic travel of the sprayer 1. Here, the first manipulation terminal 210 communicates wirelessly with the sprayer 1 via the communication network N1. Thus, as long as the first manipulation terminal 210 is in an environment where the first manipulation terminal 210 can be connected to (communicate with) the communication network N1, the first manipulation terminal 210 that is located away from the sprayer 1, that is, located remotely in the field F1, can control the sprayer 1.

As illustrated in FIG. 5, the first manipulation terminal 210 includes: a display unit 211 that displays various types of information; and a manipulation unit 212 that accepts manipulation. Examples of the display unit 221 include, but are not limited to, a liquid-crystal display and an organic EL display. Examples of the manipulation unit 212 include, but are not limited to, a touch panel, a physical switch, a mouse, and a keyboard. In the present embodiment, as an example, the display unit 211 having the liquid-crystal display and the manipulation unit 212 having the touch panel integrally constitute a touch panel display. Thus, when the manipulator manipulates the manipulation unit 212 in a manipulation screen that is displayed on the display unit 211, the manipulator can, for example, output the stop instruction (the temporary stop instruction) from the first manipulation terminal 210 to the sprayer 1.

Furthermore, the first manipulation terminal 210 has a function of setting (registering) various types of information on control of the sprayer 1. An example of the information on the control of the sprayer 1 is the target route for the automatic travel of the sprayer 1. That is, the manipulator can set the target route and the like by manipulating the manipulation unit 212 in the display screen that is displayed on the display unit 211. The information, such as the target route, that is set herein is sent to the sprayer 1 either directly or indirectly via the server 201 or the like. Then, the information is used for the automatic travel of the sprayer 1.

During the automatic travel of the sprayer 1, the first manipulation terminal 210 can display various types of information on operation of the sprayer 1 on the display unit 211. Examples of the information include, but are not limited to, the current position, the current azimuth, and a (spray) work status of the sprayer 1. For example, in the first manipulation terminal 210, the display unit 211 provides a monitoring screen that displays the target route, the current position, and the like of the sprayer 1 on a map simulating the field F1. This allows the manipulator to easily, visually comprehend a state of the sprayer 1. Here, for example, the monitoring screen preferably displays information on a remaining amount of the chemical solution that is the spray material, information on a fuel remaining amount, information on a battery remaining amount, and the like.

The second manipulation terminal 220 is a dedicated wireless communication terminal that can be carried by the manipulator. The second manipulation terminal 220 enables the remote manipulation of the sprayer 1 as follows. In response to the manipulator's manipulation, the second manipulation terminal 220 outputs (sends), to the sprayer 1, the stop instruction (the temporary stop instruction) that at least stops the automatic travel of the sprayer 1. Here, the second manipulation terminal 220 is communicable with the sprayer 1 by a different communication system from the communication system for the first manipulation terminal 210.

More specifically, the second manipulation terminal 220 directly, wirelessly communicates with the sprayer 1 without the communication network N1 being interposed therebetween. Thus, as long as the second manipulation terminal 220 is in an environment where the second manipulation terminal 220 can be connected to (communicate with) the sprayer 1, the second manipulation terminal 220 that is located away from the sprayer 1, that is, located remotely in the field F1, can manipulate the sprayer 1. However, a range where the second manipulation terminal 220 can be connected to the sprayer 1 is limited to a short-distance range where the position of the second manipulation terminal 220 from the sprayer 1 is closer than the position of the first manipulation terminal 210 from the sprayer 1. Examples of such a range include a range within the field F1 and a range around the field F1. Thus, as long as the manipulator is at a position where the manipulator can visually recognize the sprayer 1, the manipulator can basically control the sprayer 1 by manipulating the second manipulation terminal 220.

As illustrated in FIG. 4 and FIG. 5, the second manipulation terminal 220 includes a first manipulation unit 221, a second manipulation unit 222, and a third manipulation unit 223, each of which individually accepts manipulation. Examples of each of the first manipulation unit 221, the second manipulation unit 222, and the third manipulation unit 223 include, but are not limited to, a physical switch, a touch panel, a mouse, and a keyboard. In the present embodiment, as an example, each of the first manipulation unit 221, the second manipulation unit 222, and the third manipulation unit 223 is a momentary push button switch that is the physical switch (a mechanical switch). Thus, when the manipulator manipulates any one of the first manipulation unit 221, the second manipulation unit 222, and the third manipulation unit 223, the manipulator can output, for example, the stop instruction (the temporary stop instruction or an emergency stop instruction) from the second manipulation terminal 220 to the sprayer 1.

Here, different functions are assigned to the first manipulation unit 221, the second manipulation unit 222, and the third manipulation unit 223. For this reason, a type of the instruction to be output (sent) to the sprayer 1 by the second manipulation terminal 220 is determined by which of the first manipulation unit 221, the second manipulation unit 222, and the third manipulation unit 223 is pressed (manipulated) by the manipulator. More specifically, the "temporary stop" is assigned to the first manipulation unit 221, the "emergency stop" is assigned to the second manipulation unit 222, and the "travel start" is assigned to the third manipulation unit 223. Thus, for example, when the manipulator manipulates the first manipulation unit 221, the second manipulation terminal 220 outputs the temporary stop instruction that is one type of the stop instructions to stop the automatic travel of the sprayer 1.

As described above, in the present embodiment, the sprayer 1 can communicate wirelessly with the plural types of the manipulation terminals that at least includes the first manipulation terminal 210 and the second manipulation terminal 220, and the sprayer 1 is controlled according to the instruction from each of these plural types of the manipulation terminals. In other words, each of the first manipulation terminal 210 and the second manipulation terminal 220 constitutes a remote manipulation device (a remote controller) that enables the remote manipulation of the sprayer 1. Thus, the manipulator can stop, for example, the automatic travel of the sprayer 1 even when the manipulator is at the position away from the sprayer 1.

The server 201 is an information processor such as a server device. The server 201 sends the information to the sprayer 1, and the information includes, but is not limited to, information on the target route on which the sprayer 1 travels automatically.

In the present embodiment, as illustrated in FIG. 1, a vertical direction in a usable state of the sprayer 1 is defined as an up-down direction D1 for convenience of description. In addition, the right-left direction D2 and the front-rear direction D3 are each defined with a direction that is seen from a center point of the sprayer 1 in the plan view being a reference. That is, an advancing direction of the sprayer 1 during forward travel is the front in the front-rear direction D3, and the advancing direction of the sprayer 1 during reverse travel is the rear in the front-rear direction D3. However, these directions are not intended to limit a use direction (a direction in use) of the sprayer 1.

[2] Details of Sprayer

Figure 6:
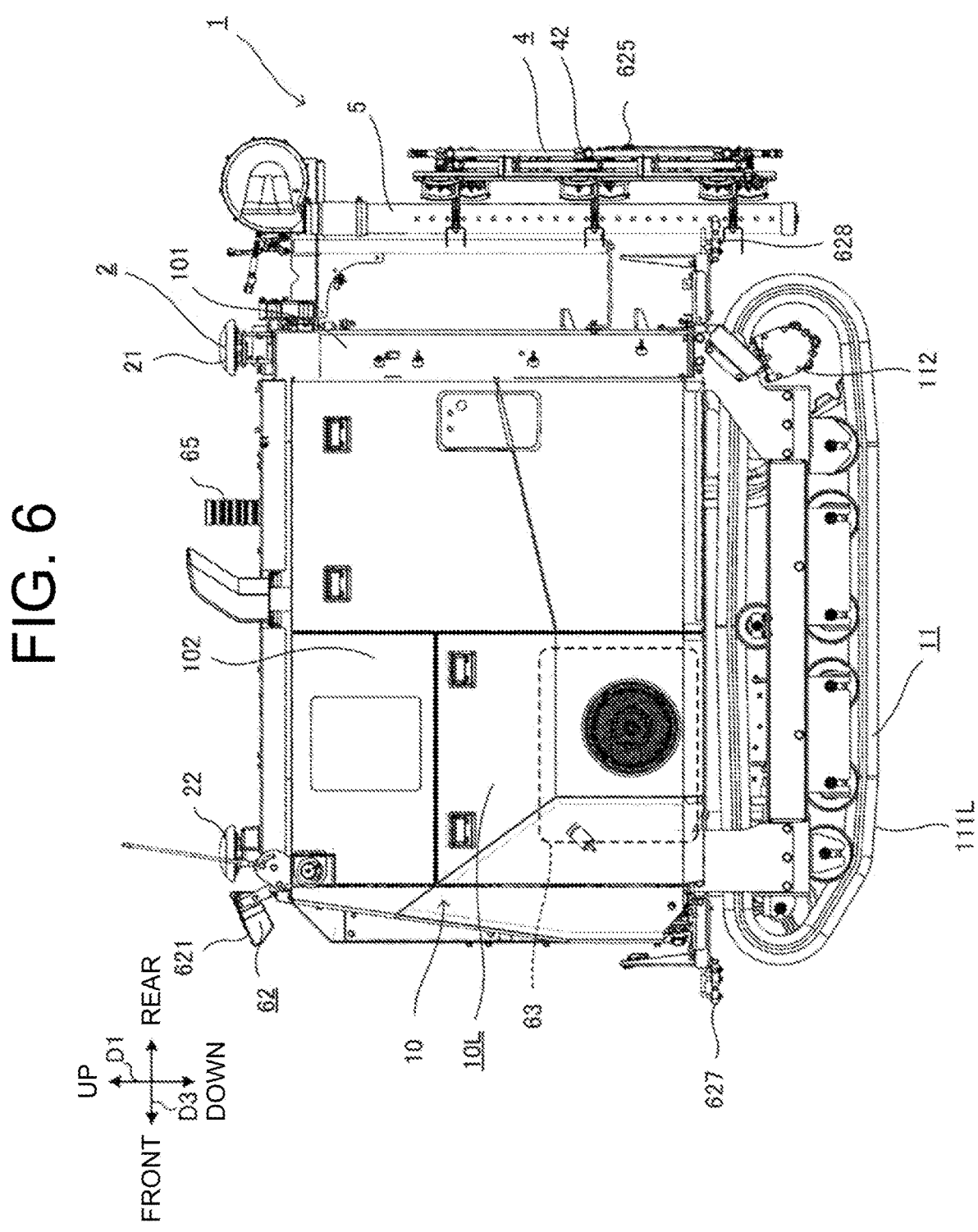
FIG. 6 is a left external view in which the sprayer according to the first embodiment is seen from a left side.
Figure 7:
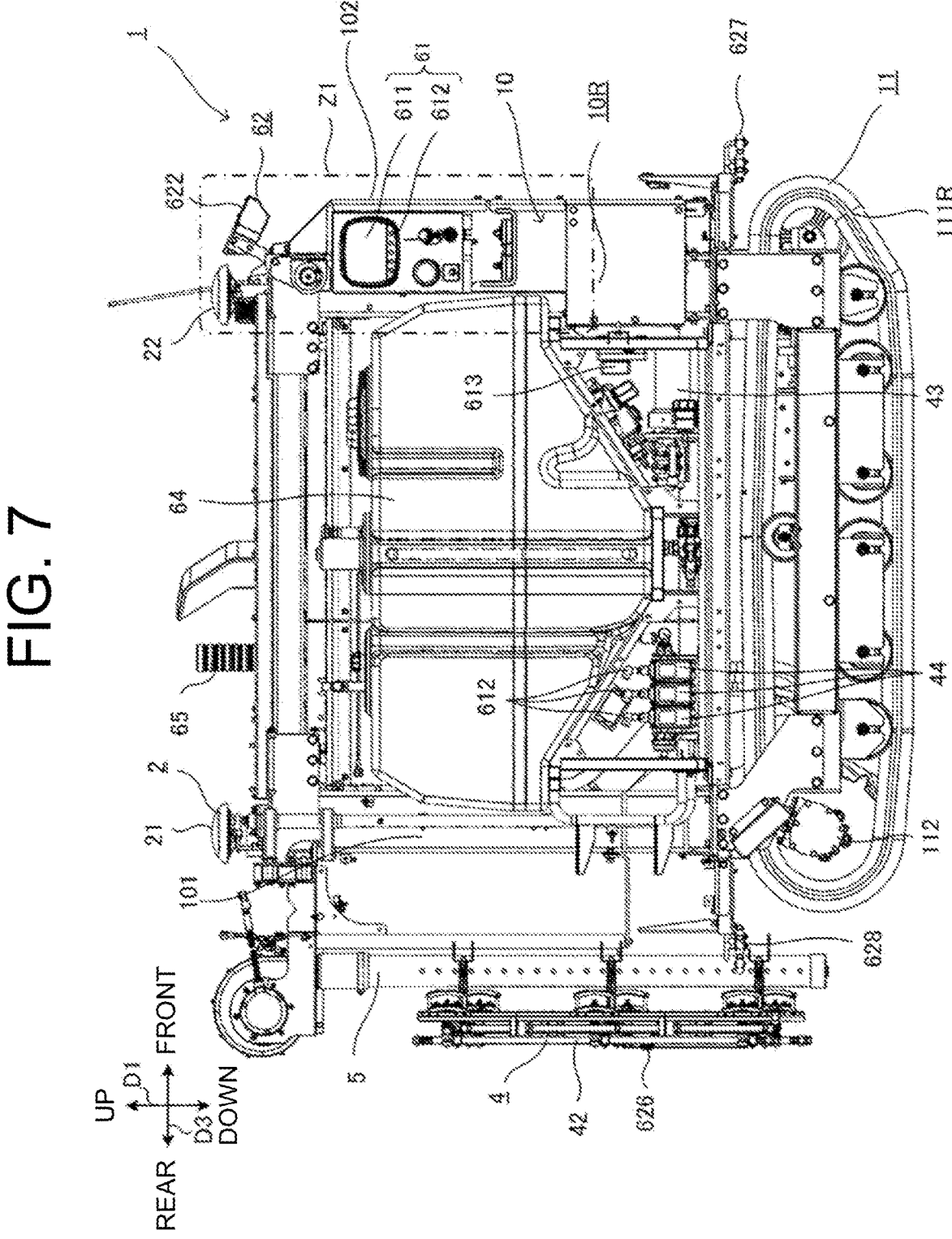
FIG. 7 is a right external view in which the sprayer according to the first embodiment is seen from a right side.
Figure 8:
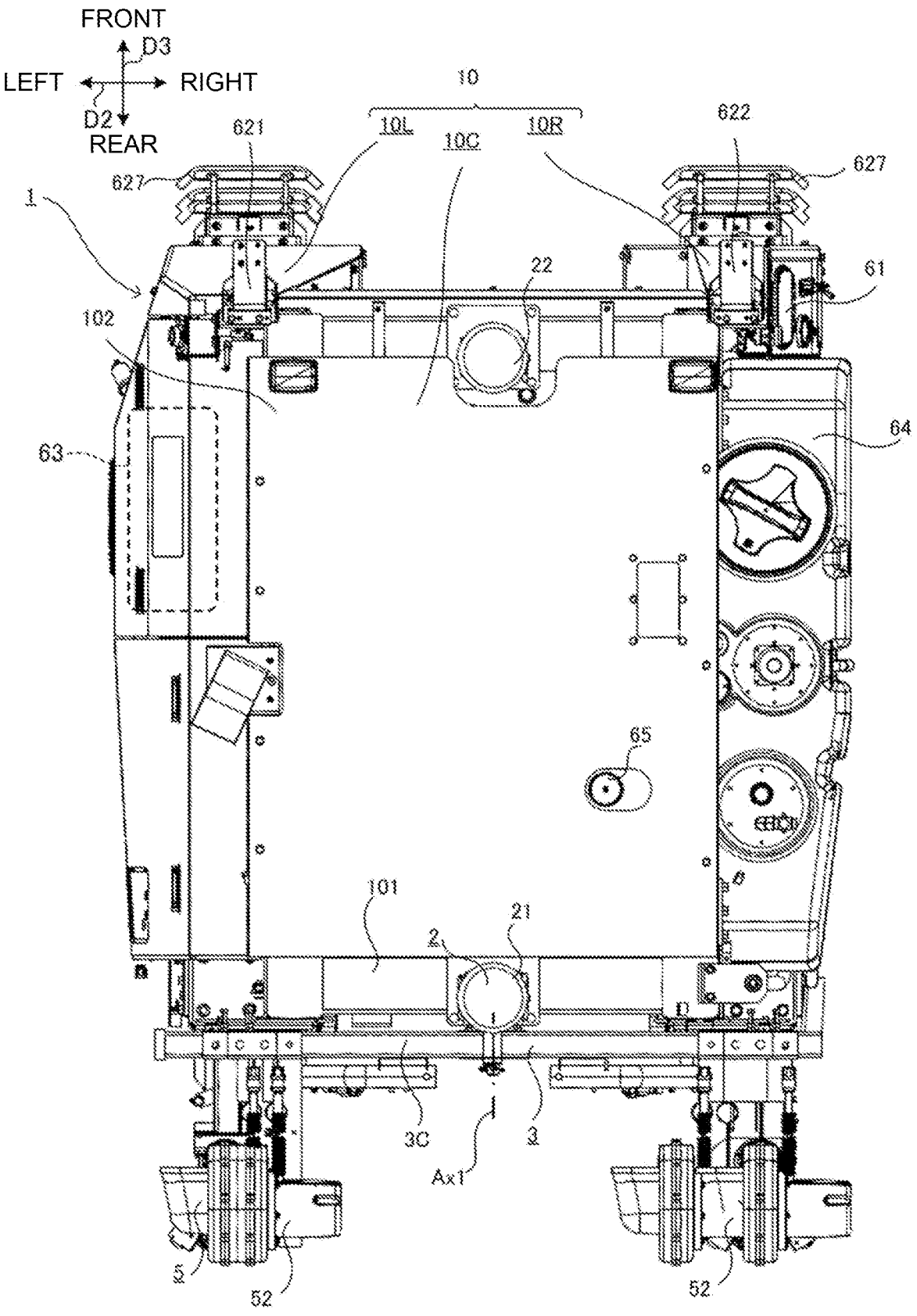
FIG. 8 is an upper external view in which the sprayer according to the first embodiment is seen from above.
Figure 9:
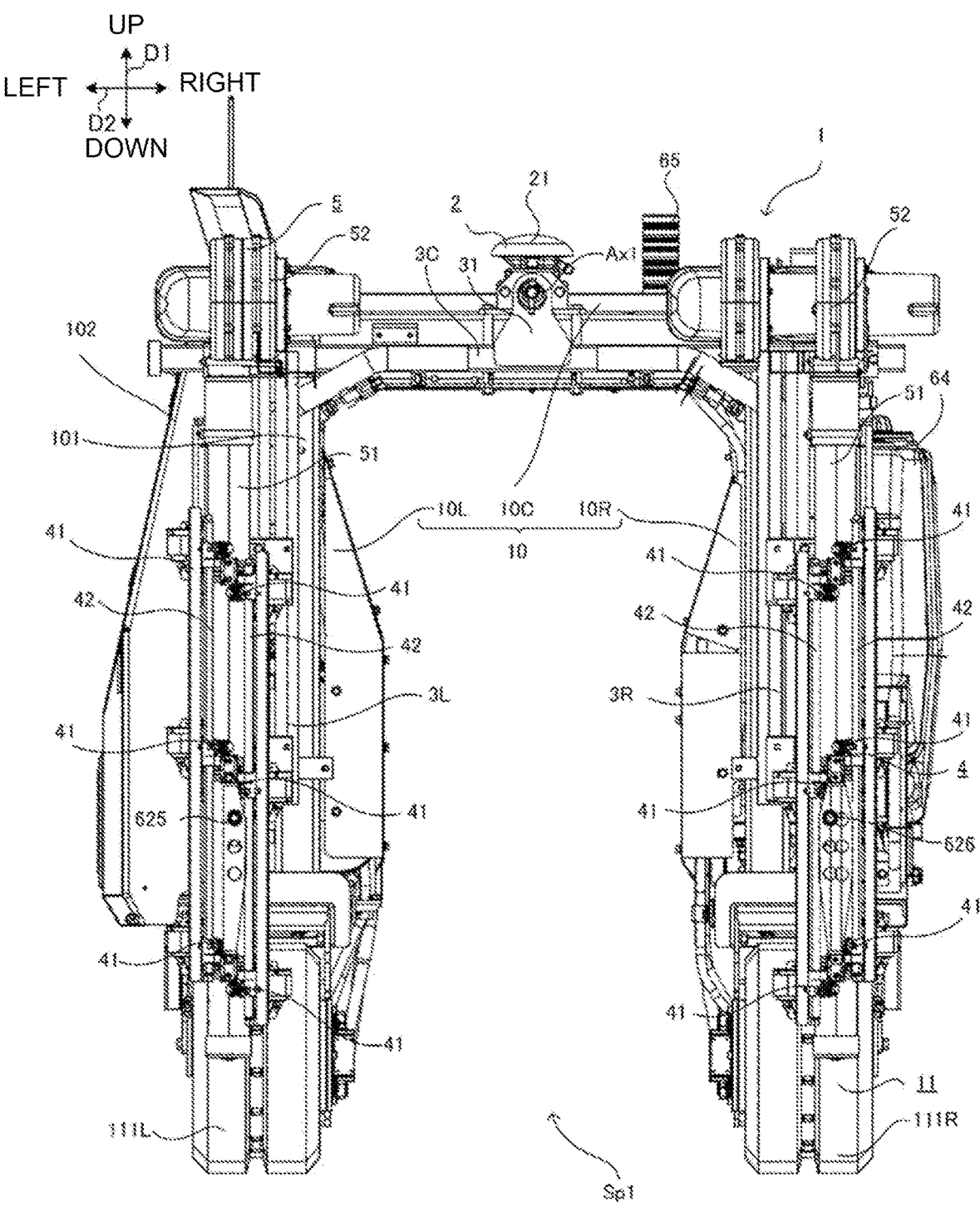
FIG. 9 is a back external view in which the sprayer according to the first embodiment is seen from the back side.
Figure 10:
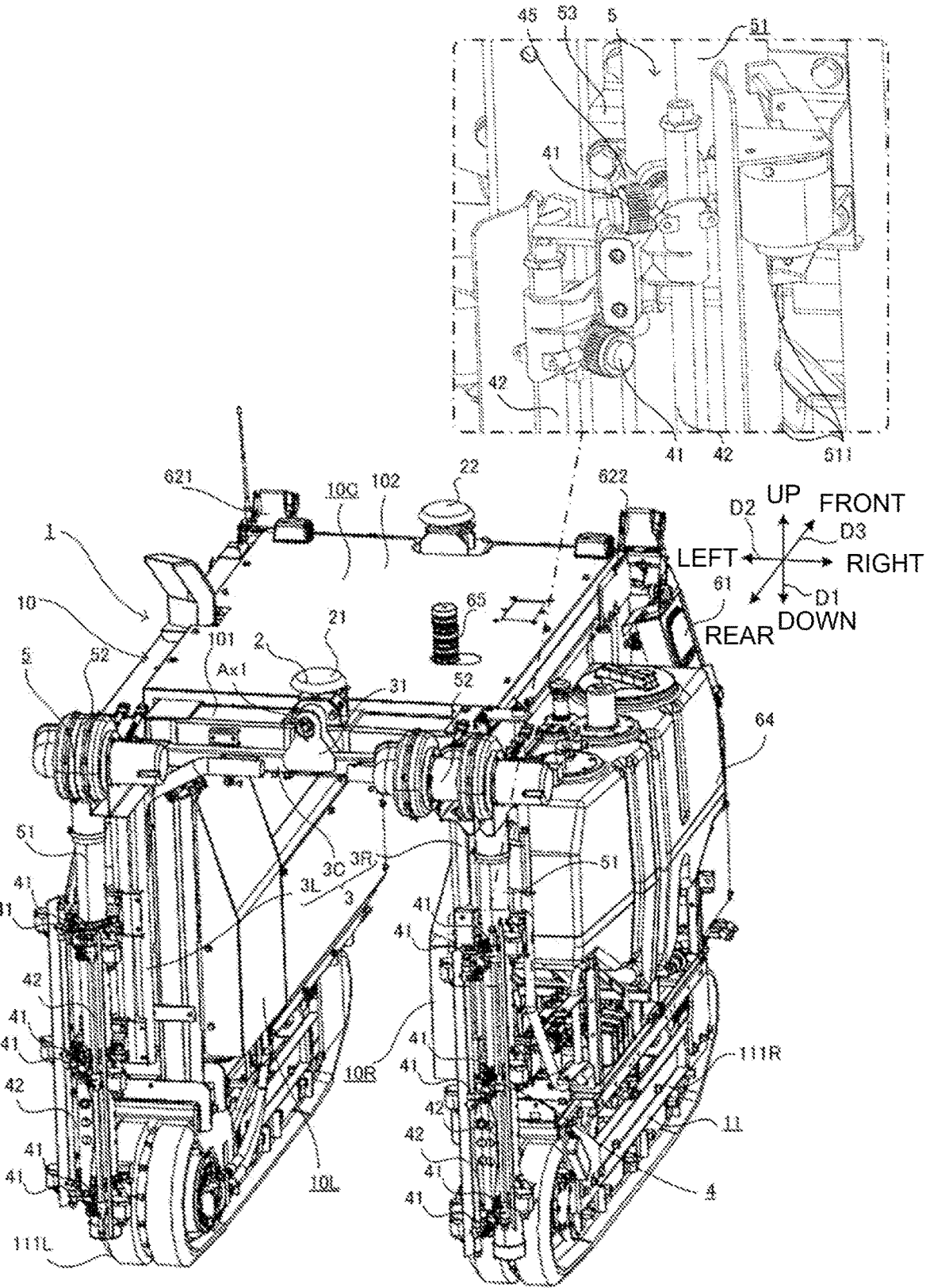
FIG. 10 is a schematic view illustrating a state where the sprayer according to the first embodiment is seen obliquely from behind.
Figure 11:
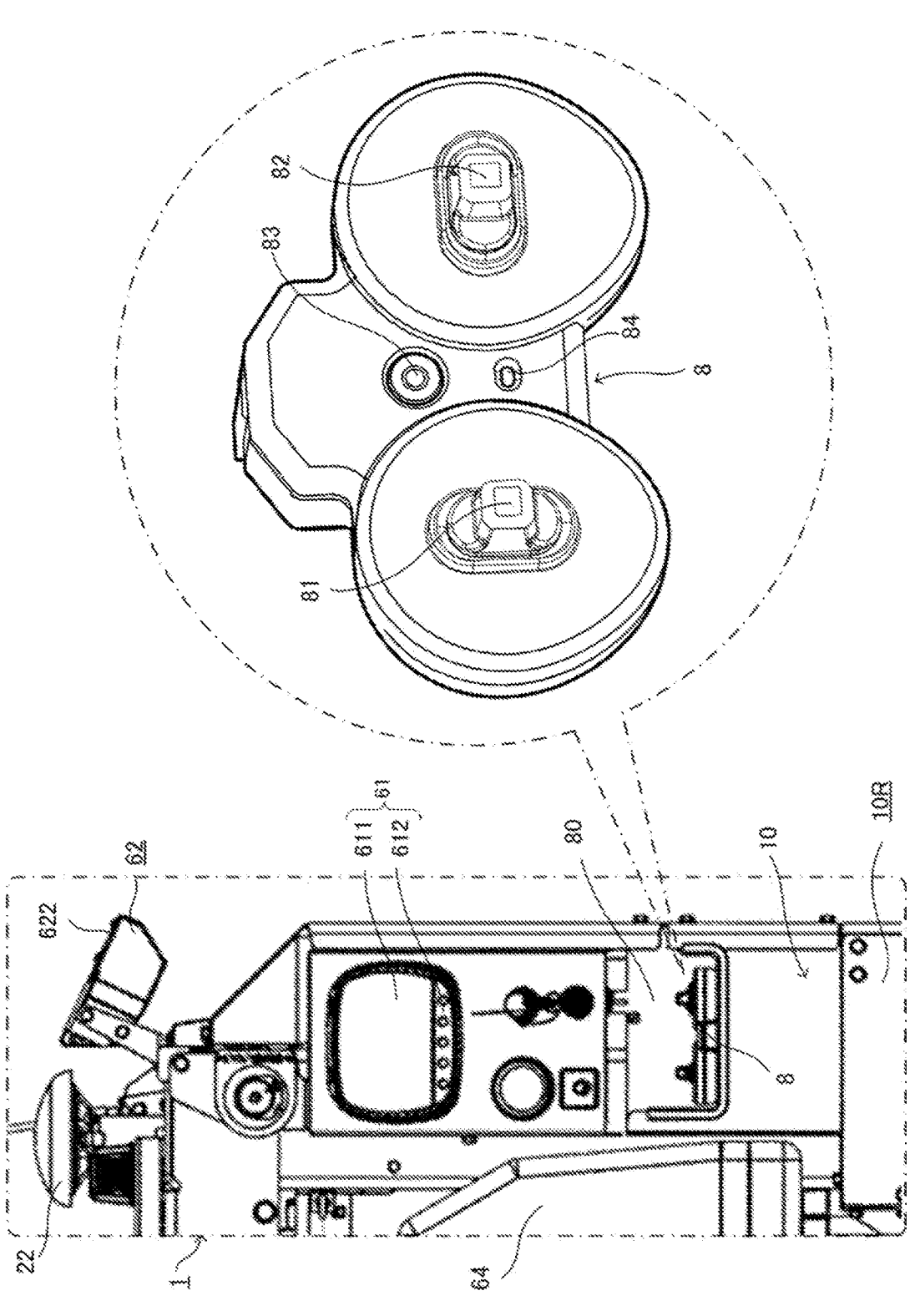
FIG. 11 is an enlarged view of an area Z1 in FIG. 7, and provides an external view of a manual manipulation device in a bubble.

Next, a detailed description will be made on the configuration of the sprayer 1 with reference to FIG. 1, FIG. 2, and FIG. 5 to FIG. 11. FIG. 1 is an external appearance view in which the sprayer 1 is seen from the front left side. FIG. 2 is an external appearance view in which the sprayer 1 is seen from a back side (the rear side). FIG. 5 is a block diagram schematically illustrating the main configuration of the sprayer 1. FIG. 6 is an external appearance view in which the sprayer 1 is seen from the left side. FIG. 7 is an external appearance view in which the sprayer 1 is seen from the right side. FIG. 8 is an upper external appearance view in which the sprayer 1 is seen from above. FIG. 9 is a back external appearance view in which the sprayer 1 is seen from the back side (behind). FIG. 10 is a schematic view illustrating a state where the sprayer 1 is seen obliquely from behind, and provides a partial enlarged view of the sprayer 1 in a bubble. FIG. 11 is an enlarged view of an area Z1 in FIG. 7, and provides an external view of a manual manipulation device 8 in a bubble.

The sprayer 1 includes the body 10, the travel unit 11, a support frame 3, and a spray device 4. In the present embodiment, as illustrated in FIG. 5, the sprayer 1 further includes the positioning device 2, a controller 7, the manual manipulation device 8, an airflow generation unit 5, a communication device 60, a user interface 61, an obstacle detector 62, a power source 63, a tank 64 (see FIG. 7), a display 65, a sensor device 66, and the like. Moreover, the sprayer 1 includes a fuel tank, a battery, and the like. In the present embodiment, a structure of the sprayer 1 including the body 10 and the support frame 3 is basically made of metal, and a material therefor is selected according to required strength, required weather resistivity, and the like. However, the structure of the sprayer 1 is not limited to the structure made of metal. A structure that is made of resin, wood, or the like may appropriately be used, for example.

The body 10 is a main body of the sprayer 1 and supports most of the components of the sprayer 1 including the positioning device 2, the support frame 3, and the like. The body 10 has a frame 101 (see FIG. 2) and a cover 102. The frame 101 is a member that constitutes framework of the body 10, and supports heavy objects such as the power source 63 and the tank 64. The cover 102 is a member that constitutes a contour of the body 10. The cover is attached to the frame 101 in a manner to at least cover a part of the frame 101 and some of the members mounted to the frame 101. In a part of a rear surface (a back surface) of the body 10 and a part of a right surface of the body 10, the frame 101 is not covered with the cover 102 and thus is exposed. The cover 102 is divided into plural parts. These plural parts are separately removable from the frame 101. Thus, for example, a part of the cover 102 that corresponds to one of the devices (the members) such as the power source 63 can only be detached. In this way, only one of the devices (the members) such as the power source 63 can be exposed.

As described above, the body 10 has the first block 10L and the second block 10R that aligned in the right-left direction D2. The first block 10L and the second block 10R oppose each other with a certain value or more of the interval being provided therebetween in the right-left direction. In the present embodiment, as an example, the first block 10L is located on the left side, and the second block 10R is located on the right side. Thus, the first block 10L constitutes a left portion of the body 10, and the second block 10R constitutes a right portion of the body 10. Furthermore, the body 10 has the coupling section 10C that couples the first block 10L and the second block 10R. In a front view (when seen from the front), the coupling section 10C is long in the right-left direction D2, and each of the first block 10L and the second block 10R is long in the up-down direction D1.

Here, the coupling section 10C couples the upper end portions of the first block 10L and the second block 10R. Thus, in other words, the first block 10L and the second block 10R are projected downward from both ends (in the right-left direction D2) of the coupling section 10C. As a result, the body 10 defines the gate shape with the first block 10L, the second block 10R, and the coupling section 10C. The gate-shaped body 10 is opened to both sides in the front-rear direction D3 and is opened downward. Then, the space Sp1 is provided inside the body 10. The space Sp1 is surrounded by the first block 10L, the second block 10R, and the coupling section 10C in three directions and is opened in the front-rear direction D3.

In short, as illustrated in FIG. 2, the body 10 provides the space Sp1 between the first block 10L and the second block 10R, and the crop V1 (the work object) to be worked (subjected to the spraying work) by the spray device 4 (a work unit) passes through the space Sp1. More specifically, the crop V1, which is the spray target, in a standard size is set as a reference. Then, a dimension of each part of the body 10 is set so that the space Sp1 having a greater height and a greater width than a height and a width of the crop V1 is provided. Thus, the body 10 can allow the crop V1 in the standard size to pass through the body 10 in a state where the body 10 straddles the crop V1 and the crop V1 keeps a distance of a predetermined value or greater from the body 10 to prevent contact therewith. While the crop V1 passes through the space Sp1, the first block 10L is located on the left side of the crop V1, the second block 10R is located on the right side of the crop V1, and the coupling section 10C is located above the crop V1.

In detail, in the present embodiment, the body 10 is configured to be substantially symmetrical in the right-left direction D2. Each of the first block 10L and the second block 10R is substantially formed in the same rectangular shape and the same size in the side view. Each of the first block 10L and the second block 10R has a shape that is flat in the right-left direction D2. Thus, the dimensions of the first block 10L and the second block 10R in the right-left direction D2 are the smallest of the dimensions in the up-down direction D1, the right-left direction D2, and the front-rear direction D3. In each of the first block 10L and the second block 10R, a portion above a center in the up-down direction D1 is tapered such that the dimension of the portion in the right-left direction D2 is reduced upward. In the plan view, the coupling section 10C is formed in a rectangular shape whose dimension in the right-left direction D2 is larger than a dimension in the front-rear direction D3. Thus, the dimension of the coupling section 10C in the up-down direction D1 is the smallest of the dimensions in the up-down direction D1, the right-left direction D2, and the front-rear direction D3.

As described above, the body 10 can be roughly divided into three portions (blocks) that are the first block 10L, the second block 10R, and the coupling section 10C. Each of the first block 10L, the second block 10R, and the coupling section 10C has the frame 101 and the cover 102. In other words, each of the first block 10L and the second block 10R has the frame 101 and the cover 102. Furthermore, most of the components of the sprayer 1 including the positioning device 2 and the support frame 3 are separately provided to the first block 10L, the second block 10R, and the coupling section 10C.

The travel unit 11 is a travel device (a vehicle body) that makes the sprayer 1 travel. The travel unit 11 is provided in a lower portion of the body 10. The travel unit 11 allows the body 10 to travel (and turn) on the ground. Thus, the body 10 can move in the right-left direction D2 and the front-rear direction D3 in the field F1. Since such a travel unit 11 is provided to the body 10, the sprayer 1 can perform the work (the spraying work) while moving in the field F1.

The travel unit 11 includes the pair of crawlers (crawler tracks) 111L, 111R that are aligned in the right-left direction D2 (see FIG. 1). The pair of crawlers 111L, 111R is arranged at a certain interval in the right-left direction D2. Between these paired crawlers 111L, 111R, the space Sp1 is formed in the manner to allow the crop V1, which is the spray target, to pass therethrough. That is, the left crawler 111L located on the left side of the space Sp1 opposes the right crawler 111R located on the right side of the space Sp1 with the space Sp1 being interposed therebetween. In the case where the left crawler 111L and the right crawler 111R are not particularly distinguished from each other, each of the crawlers 111L, 111R will also simply be referred to as the "crawler 111". The travel unit 11 also includes a motor 112 (see FIG. 1) that drives the crawler 111. That is, the travel unit 11 is a crawler-type (caterpillar-type) travel device, and drives the crawler 111 in an endless belt shape with the motor 112, so as to make the sprayer 1 travel.

Here, at least two of the motors 112 are provided in a manner to correspond to the paired crawlers 111L, 111R. The left motor 112 for driving the left crawler 111L and the right motor 112 for driving the right crawler 111R can each drive the respective crawler 111 separately. In the present embodiment, as an example, the motor 112 is a hydraulic motor (an hydraulic actuator). The motor 112 drives the crawler 111 when hydraulic oil is supplied from a hydraulic pump. With such a configuration, the body 10 can travel stably even below a rough road surface condition of the field F1.

Here, the crawler 111 and the motor 112 are provided below each of the first block 10L and the second block 10R. That is, the first block 10L has the left crawler 111L and the motor 112 that drives the crawler 111L. The second block 10R has the right crawler 111R and the motor 112 that drives the crawler 111R. In the present embodiment, the paired crawlers 111L, 111R are substantially asymmetrical in the right-left direction D2, and the paired motors 112 are substantially asymmetrical in the right-left direction D2. Just as described, the paired travel units 11 are separated from each other in the right-left direction D2 by the space Sp1. Thus, the sprayer 1 can travel while keeping a stable posture in any of the various road surface conditions of the field F1. An example of the road surface condition is a laterally inclined slope on which either side in the right-left direction D2 is lower than the other side.

Here, in a state where a hydrostatic continuously variable transmission can separately change speeds of the paired crawlers 111L, 111R, the paired crawlers 111L, 111R are driven with power from the power source 63. Consequently, when the pair of the crawlers 111L, 111R is driven at a constant speed in a forward travel direction, the body 10 is brought into a forward travel state where the body 10 travels straight in the forward travel direction. When the pair of the crawlers 111L, 111R is driven at a constant speed in a reverse travel direction, the body 10 is brought into a reverse travel state where the body 10 travels straight in the reverse travel direction. When the pair of the crawlers 111L, 111R is driven at a non-constant speed in the forward travel direction, the body 10 is brought into a forward turning state where the body 10 turns while traveling straight. When the pair of the crawlers 111L, 111R is driven at a non-constant speed in the reverse travel direction, the body 10 is brought into a reverse turning state where the body 10 turns while traveling reversely. Furthermore, in the case where one of the paired crawlers 111L, 111R is driven while the other is not driven, the body 10 is brought into a pivotal turning (pivotal brake turning) state. In the case where one of the paired crawlers 111L, 111R is driven at the constant speed in the forward travel direction while the other is driven at the constant speed in the reverse travel direction, the body 10 is brought into a spin turning (counter-rotation turning) state. Moreover, when driving of the paired crawlers 111L, 111R is stopped, the body 10 is brought into a travel stop state.

The power source 63 and the like are mounted to the first block 10L, and the tank 64 and the like are mounted to the second block 10R. The components of the sprayer 1 are separately arranged to the first block 10L and the second block 10R of the body 10, just as described. Thus, the sprayer 1 is balanced in the right-left direction D2 and has a low center of gravity. As a result, the sprayer 1 can travel stably on the slope or the like in the field F1.

As described above, the positioning device 2 is a device that detects the current position, the current azimuth, and the like of the body 10. The positioning device 2 at least has the antenna 21. The antenna 21 receives the GNSS signal or the like that is sent from the satellite 203. That is, the antenna 21 includes a position identification antenna for identifying the position of the body 10. Here, the antenna 21 is arranged on an upper surface (a top surface) of the body 10 so as to easily receive the signal (the GNSS signal) from the satellite 203. In other words, the antenna 21 is arranged at a higher position than the highest position in the body 10. Furthermore, the positioning device 2 includes a posture detection section and the like, and the posture detection section detects the posture of the body 10.

In the present embodiment, the positioning device 2 further has an antenna 22 as a second antenna in addition to the antenna 21 as a first antenna. The positioning device 2 receives the GNSS signal or the like from each of these two antennas 21, 22. Here, the antenna 22 (the second antenna) is arranged in alignment with the antenna 21 (the first antenna) in the front-rear direction D3. Thus, the positioning device 2 can send/receive the signal (the GNSS signal or the like) to/from each of the antennas 21, 22. In particular, in the case where the antennas 21, 22 are the position identification antennas, the current positions of the front portion and the rear portion of the body 10 can be identified. Thus, it is also possible to identify an orientation (the current azimuth) of the body 10.

The support frame 3 is a member that is attached to one end portion in the front-rear direction D3 of the body 10 and supports a spray nozzle 41 of the spray device 4, which will be described below. In the present embodiment, the support frame 3 is attached to a rear end portion of the body 10. Similar to the body 10, the support frame 3 has a gate shape. In a back view (when seen from the rear side), the support frame 3, is arranged at an overlapping position with the body 10. More specifically, the support frame 3 has: a vertical frame 3L (a first vertical frame) and a vertical frame 3R (a second vertical frame) that are arranged in alignment in the right-left direction D2; and a horizontal frame 3C that couples upper ends of the vertical frame 3L and the vertical frame 3R. In this way, with the vertical frame 3L, the vertical frame 3R, and the horizontal frame 3C the support frame 3 defines the gate shape that surrounds the left side, the right side, and the upper side of the space Sp1.

More specifically, the support frame 3 has the vertical frame 3L and the vertical frame 3R that are arranged in alignment in the right-left direction D2. The vertical frame 3L and the vertical frame 3R oppose each other at an interval of a certain value or more in the right-left direction D2. In the present embodiment, as an example, the vertical frame 3L is located on the left side, and the vertical frame 3R is located on the right side. Thus, the vertical frame 3L is located behind the first block 10L of the body 10, and the vertical frame 3R is located behind the second block 10R of the body 10. In the back view (when seen from the rear side), the horizontal frame 3C is long along the right-left direction D2, and each of the vertical frame 3L and the vertical frame 3R is long along the up-down direction D1.

Here, the horizontal frame 3C couples the upper ends of the vertical frame 3L and the vertical frame 3R. Thus, in other words, the vertical frame 3L and the vertical frame 3R are projected downward from both ends (in the right-left direction D2) of the horizontal frame 3C. Just as described, the support frame 3 has: the horizontal frame 3C that is long along the right-left direction D2; and the paired vertical frames 3L, 3R that are long along the up-down direction D1 and are projected downward from both the sides of the horizontal frame 3C. As a result, with the vertical frame 3L, the vertical frame 3R, and the horizontal frame 3C, the support frame 3 defines the gate shape that is opened to both the sides in the front-rear direction D3 and is opened downward. Then, the space Sp1 is provided on the inner side of the support frame 3. The space Sp1 is surrounded by the vertical frame 3L, the vertical frame 3R, and the horizontal frame 3C and is opened in the front-rear direction D3.

In short, as illustrated in FIG. 2, the support frame 3 provides the space Sp1 between the pair of the vertical frames 3L, 3R, and the crop V1 (the work object, the spray target) to be worked (subjected to the spraying work) by the spray device 4 (the work unit) passes through the space Sp1. More specifically, the crop V1, which is the spray target, in the standard size is set as the standard. Then, a dimension of each part of the support frame 3 is set in a manner to provide the space Sp1 with the greater height and the greater width than those of the crop V1. Thus, the support frame 3 can allow the crop V1 in the standard size to pass therethrough in a state where the support frame 3 straddles the crop V1 and the crop V1 keeps a distance of a predetermined value or longer from the support frame 3 to prevent contact therewith. While the crop V1 passes through the space Sp1, the vertical frame 3L is located on the left side of the crop V1, the vertical frame 3R is located on the right side of the crop V1, and the horizontal frame 3C is located above the crop V1.

In detail, in the present embodiment, the support frame 3 is configured to be substantially symmetrical in the right-left direction D2. Each of the vertical frame 3L and the vertical frame 3R has a cylindrical shape with a circular cross section. In the present embodiment, as an example, each of the vertical frame 3L and the vertical frame 3R is configured that two cylindrical members are arranged in parallel. The horizontal frame 3C has a square tubular shape with a rectangular cross section. Here, each of the vertical frame 3L and the vertical frame 3R is firmly fixed to the horizontal frame 3C by an appropriate fixing member/method such as a connection fitting, a brace fitting, or welding. Thus, each of the vertical frame 3L and the vertical frame 3R maintains an orthogonal state to the horizontal frame 3C. In other words, in the back view, a corner between the vertical frame 3L and the horizontal frame 3C and a corner between the vertical frame 3R and the horizontal frame 3C each define a right angle.

In the present embodiment, the support frame 3 is supported by the body 10 in a manner to be rotatable about a rotation axis Ax1 (see FIG. 8 and FIG. 9) while maintaining a relative positional relationship between the horizontal frame 3C and the pair of the vertical frames 3L, 3R. The rotational axis Ax1 is an axis that passes through a fulcrum section 31 provided to the horizontal frame 3C and extends along the front-rear direction D3. That is, the support frame 3 that supports the work unit (the spray nozzle 41) is supported by the body 10 in the manner to be rotatable about the rotation axis Ax1 along the front-rear direction D3. Here, the term "rotation axis" in the present disclosure means a virtual axis (a straight line) that serves as a center of rotational motion of a rotating body. In other words, the rotation axis Ax1 is an insubstantial virtual axis. However, the rotation axis Ax1 may be a substantial member such as a shaft pin.

The spray device 4 has the spray nozzle 41 and the like. The spray device 4 performs the spraying work to spray the chemical solution as the spray material stored in the tank 64 on the crop V1 as the spray target. The spray nozzle 41 is a portion that is supported by the support frame 3 and sprays the spray material. In the present embodiment, as an example, the spray nozzle 41 is a discharge port (a spay unit) that actually serves as an outlet of the spray material (the chemical solution). The spray device 4 has the plural (12 as an example in the present embodiment) spray nozzles 41.

The spray device 4 has, in addition to the spray nozzle 41, a spray pipe 42, a pump 43 (see FIG. 7), a valve 44 (see FIG. 7), spray piping, and the like. The spray nozzle 41 is an example of the work unit that performs the work (the spraying work), and is supported by the support frame 3. Since the support frame 3 is supported by the body 10, the spray nozzle 41 (the work unit) is indirectly supported by the body 10. In the present embodiment, the spray nozzle 41 is attached to the spray pipe 42. The spray piping connects the spray pipe 42 to the pump 43 via the valve 44. The pump 43 pressure-feeds the spray material (the chemical solution) stored in the tank 64 to the spray pipe 42. The valve 44 is an electronically-controlled valve unit such as an electromagnetic valve and changes a pressure (a spraying pressure), a spray pattern, and the like at the time of spraying the spray material. As a result, the chemical solution in the tank 64 is supplied to the spray nozzle 41 via the valve 44 and the spray pipe 42 by the pump 43, and is sprayed from the spray nozzle 41. Here, the atomized chemical solution is discharged (sprayed) from the spray nozzle 41.

In detail, as illustrated in FIG. 9 and FIG. 10, the spray pipe 42 is piping that is long in the up-down direction D1, and the two spray pipes 42 are attached to each of the vertical frame 3L and the vertical frame 3R of the support frame 3. That is, in the present embodiment, the spray device 4 has a total of four spray pipes 42. The two (paired) spray pipes 42 that are attached to each of the vertical frame 3L and the vertical frame 3R are arranged in alignment in the right-left direction D2. The chemical solution as the spray material that is poured into each of the spray pipes 42 from an upper end thereof flows downward through the respective spray pipe 42 and is discharged from either one of the three spray nozzles 41. The three spray nozzles 41 are attached to each of the spray pipes 42. Thus, the spray device 4 has a total of the 12 spray nozzles 41.

Each of the spray nozzles 41 is attached to the corresponding spray pipe 42 such that a position of the respective spray nozzle 41 can be changed in the up-down direction D1. Thus, it is possible to change an interval between the adjacent spray nozzles 41 and a height position of each of the spray nozzles 41 with respect to the spray pipe 42 according to the spray object (the crop V1). In addition, each of the spray nozzles 41 is attached such that the position thereof in the up-down direction D1 with respect to the body 10, the position thereof in the right-left direction D2 with respect to the body 10, and an orientation (an angle) thereof can be changed according to the spray target. However, in the spray device 4, the number of the spray nozzles 41 that are provided to each of the spray pipes 42, and the like can appropriately be changed according to the type of the spray target (the crop V1), a length of each of the spray pipes 42, and the like.

The airflow generation unit 5 generates the airflow that conveys the spray material (the chemical solution) discharged from the spray nozzle 41. The airflow generation unit 5 is supported by the support frame 3 together with the spray nozzle 41. That is, the sprayer 1 according to the present embodiment is an air-assisted sprayer that sprays spray material (the chemical solution) by using the airflow generated in the airflow generation unit 5. As a result, the sprayer 1 can efficiently spray the spray material (the chemical solution) even on the spray target (the crop V1) at a position relatively away from the spray nozzle 41.

The airflow generation unit 5 includes a duct 51 and a blower 52. The duct 51 forms a flow path through which air flows along the up-down direction D1. The blower 52 causes air to flow through the duct 51. In the airflow generation unit 5, the air that is blown out of a blowout hole 511 (see FIG. 10) formed in the duct 51 produces the airflow. In short, in the airflow generation unit 5, the air is flowed toward the duct 51 by the blower 52, is flowed through the flow path in the duct 51, and is then blown out of the blowout hole 511. In this way, a flow of the air (the airflow) that flows outward from the blowout hole 511 is generated. With such a configuration, it is possible to generate the stable airflow over a relatively wide range. Furthermore, the airflow generation unit 5 can adjust a flow rate of the airflow by controlling the blower 52. The airflow generation unit 5 can adjust a conveyance distance of the spray material by adjusting the flow rate, and can convey the spray material farther as the flow rate is increased. Thus, in the sprayer 1 according to the present embodiment, it is possible to adjust a spraying range of the spray material by the spray device 4.

In further detail, the duct 51 is a pipe that is long in the up-down direction D1, and one each of the ducts 51 is attached to the vertical frame 3L and the vertical frame 3R of the support frame 3. That is, in the present embodiment, the airflow generation unit 5 has a total of the two ducts 51. Each of the ducts 51 is formed with a plurality of the blowout holes 511 on a left surface of the respective duct 51 in alignment along the up-down direction D1. Furthermore, at a position behind each of the ducts 51, the two spray pipes 42 of the spray device 4 are fixed to the respective duct 51.

Here, two sets of the duct 51, the two spray pipes 42 attached thereto, and a total of the six spray nozzles 41 attached to these two spray pipes 42 are provided, and these sets are arranged symmetrically in the right-left direction D2. The three spray nozzles 41 that are provided to the left spray pipe 42 of the two spray pipes 42 each discharge the spray material (the chemical solution) toward the front left side, and the three spray nozzles 41 that are provided to the right spray pipe 42 each discharge the spray material (the chemical solution) toward the front right side. Thus, the misty spray material that is discharged from each of the left spray nozzles 41 is conveyed leftward by the airflow that is blown leftward from the duct 51, and the misty spray material that is discharged from each of the right spray nozzles 41 is conveyed rightward by the airflow that is blown rightward from the duct 51.

As a result, of the plural (12) spray nozzles 41, the three spray nozzles 41 provided to the leftmost spray pipe 42 each spray the chemical solution leftward toward the crop V1 that is located on the outer left side of the body 10. Of the plurality of the spray nozzles 41, the three spray nozzles 41 provided to the spray pipe 42 that is adjacent to the leftmost spray pipe 42 and is located on the inner left side each spray the chemical solution rightward toward the crop V1 that is located in the space Sp1 on the inner side of the body 10. Of the plurality of the spray nozzles 41, the three spray nozzles 41 provided to the rightmost spray pipe 42 each spray the chemical solution rightward toward the crop V1 that is located on the outer right side of the body 10. Of the plurality of the spray nozzles 41, the three spray nozzles 41 provided to the spray pipe 42 that is adjacent to the rightmost spray pipe 42 and is located on the inner right side each spray the chemical solution leftward toward the crop V1 that is located in the space Sp1 on the inner side of the body 10.

With the above configuration, in the spray device 4, a set of the two spray pipes 42 and the six spray nozzles 41 that is provided to the vertical frame 3L of the support frame 3 functions as a left spray unit. Meanwhile, a set of the two spray pipes 42 and the six spray nozzles 41 that is provided to the vertical frame 3R of the support frame 3 functions as a right spray unit. A right and left pair of the spray units is arranged behind the body 10 in a manner to enable spraying in the right-left direction D2. The right and left pair of the spray units is also arranged with a clearance (the space Sp1) allowing the crop V1 to pass through being interposed therebetween.

In the spray device 4, the plural (12) spray nozzles 41 are divided into plural systems, and each of the plural systems can be controlled independently. In the present embodiment, as an example, the six spray nozzles 41 that are provided to the two inner spray pipes 42 in the right-left direction D2 of the four spray pipes 42 are classified as a first system. The three spray nozzles 41 that are provided to the leftmost spray pipe 42 are classified as a second system. The three spray nozzles 41 that are provided to the rightmost spray pipe 42 are classified as a third system. Thus, the spray patterns available for the spray device 4 include a full spray pattern in which all the spray nozzles 41 spray the spray material (the chemical solution) and a limited spray pattern in which a spray direction is limited. The limited spray patterns include: a first spray pattern in which only the six spray nozzles 41 in the first system sprays the spray material (the chemical solution); a second spray pattern in which only the three spray nozzles 41 in the second system sprays the spray material (the chemical solution); and a third spray pattern in which only the three spray nozzles 41 in the third system sprays the spray material (the chemical solution). The limited spray patterns further include: a fourth spray pattern in which only the nine spray nozzles 41 in the first and second systems spray the spray material (the chemical solution); a fifth spray pattern in which only the nine spray nozzles 41 in the first and third systems spray the spray material (the chemical solution); and the sixth spray pattern in which only the six spray nozzles 41 in the second system and the third system spray the spray material (the chemical solution).

The spray device 4 is controlled by the controller 7, and the spray pattern of the spray device 4 is thereby appropriately switched among the above-described spray patterns (a total of seven patterns including the full pattern and the six limited spray patterns). In the spray device 4, the valve 44 is at least provided for each system of the spray nozzles 41. In the present embodiment, the three valves 44 are provided so as to correspond to the three systems (the first system, the second system, and the third system). Each of these plural (three) valves 44 is controlled individually by the controller 7 to change the spray pattern. In addition, the spraying range of the spray material by the spray device 4 can be changed by changing, for each of the systems, a pressure at which the spray material is sprayed. Furthermore, in the present embodiment, the spraying range of the spray material can also be changed by adjustment of the flow rate produced by the airflow generation unit 5. This configuration can provide even more variety of the spraying ranges than the related art according to the spray target (the crop V1) or the spray material (the chemical solution).

In the present embodiment, as described above, the support frame 3 is not fixed relative to the body 10 but is rotatable about the rotation axis Ax1. With the rotation of the support frame 3, each of the plural spray nozzles 41 supported by the support frame 3 also rotates about the rotation axis Ax1.

The sprayer 1 according to the present embodiment does not include an actuator or the like that actively rotates the support frame 3. Thus, the support frame 3 rotates only after an external force acts on the support frame 3. For example, when the body 10 travels on the laterally inclined slope, the support frame 3 rotates by own weight, that is, gravity acting on the support frame 3. Here, in the case where the support frame 3 and members (the spray nozzle 41, the spray pipe 42, the airflow generation unit 5, and the like) supported by the support frame 3 have symmetrical weight balance in the right-left direction D2, the support frame 3 is maintained at a neutral position as long as the body 10 is maintained horizontally.

When the rotatable support frame 3 as described so far rotates, for example, during travel of the body 10 on the laterally inclined slope, the spray material (the chemical solution) is unlikely to be sprayed in an uneven amount (sprayed unevenly) by the spray nozzle 41. In summary, in the case where the support frame 3 is fixedly supported by the body 10, the body 10 is inclined during the travel on the laterally inclined slope. In this case, a distance of an upper portion of the crop V1 (the spray target) that extends straight in the vertical direction from the ground (the field F1) from the spray nozzle 41 differs from a distance of a lower portion of the crop V1 from the spray nozzle 41. This may lead to the uneven spray amount of the spray material. To solve the above problem, in the sprayer 1 according to the present embodiment, the support frame 3 is rotated. Thus, the support frame 3, the spray nozzle 41 supported by the support frame 3, and the like can each keep the same posture as the posture during travel on a horizontal surface. Accordingly, the distance of the upper portion of the crop V1 (the spray target) that extends straight in the vertical direction from the ground (the field F1) from the spray nozzle 41 is less likely to vary from the distance of the lower portion of the crop V1 (the spray target) from the spray nozzle 41. Thus, the unevenness of the spray amount of the spray material is easily eliminated or minimized.

As illustrated in FIG. 5, the communication device 60 has a first communication unit 601 and a second communication unit 602. The first communication unit 601 and the second communication unit 602 are communication interfaces, each of which can be operated individually. The first communication unit 601 and the second communication unit 602 use mutually different communication protocols for data communication with external devices such as the server 201, the first manipulation terminal 210, and the second manipulation terminal 220 according to the predetermined communication protocols. That is, the communication device 60 enables communication in plural communication channels (frequency bands or the like), including the communication by the first communication unit 601 and the communication by the second communication unit 602.

As an example, the first communication unit 601 employs the wireless communication to exchange a large amount of data such as image data at a high speed. In the wireless communication, a radio wave in a 2.4 GHz band that conforms with the Wi-Fi® standard is used as a communication medium, for example. The first communication unit 601 can be connected to the communication network N1 by the wireless communication. Thus, the first communication unit 601 can communicate with the first manipulation terminals 210, the server 201, and the like via the communication network N1. Here, the first communication unit 601 enables bidirectional communication at least with the first manipulation terminal 210, the server 201, and the like.

The second communication unit 602 employs the following wireless communication to exchange a smaller amount of data than the data exchanged by the first communication unit 601. In the wireless communication, the radio wave in a 400 MHz band or the radio wave in a 920 MHz band is used as a communication medium, and such a radio wave conforms with, for example, a low power radio (specific low power radio) standard that does not require a license. The second communication unit 602 can be connected to the second manipulation terminal 220 by the wireless communication. Thus, the second communication unit 602 can directly communicate with the second manipulation terminal 220. Here, the second communication unit 602 enables the bidirectional communication at least with the second manipulation terminal 220.

The user interface 61 is a device that outputs information to a user and/or accepts the user's manipulation. As illustrated in FIG. 7, the user interface 61 has: a display unit 611 such as a liquid-crystal display or an organic EL display that displays various types of information; a manipulation unit 612 such as a touch panel, a knob, or a push button switch that accepts manipulation. The manipulator who is an example of the user can make various settings by manipulating the manipulation unit 612 according to the manipulation screen that is displayed on the display unit 611. More specifically, the manipulator manipulates the manipulation unit 612 of the user interface 61 to set an operating condition of the spray device 4, and the like. Examples of the operating condition for the spray device 4 include, but are not limited to, the pressure (a jet pressure) and the flow rate of the spray material at the time of being sprayed from the spray nozzle 41.

The obstacle detector 62 includes a first sensor 621, a second sensor 622, a third sensor 623, and a fourth sensor 624. Each of the first sensor 621 to the fourth sensor 624 is arranged to face the front of the body 10. The first sensor 621 is arranged at a front left end of the upper surface of the body 10, the second sensor 622 is arranged at a front right end of the upper surface of the body 10, the third sensor 623 is arranged to a front surface of the first block 10L, and the fourth sensor 624 is arranged to a front surface of the second block 10R. The obstacle detector 62 further includes a fifth sensor 625 (see FIG. 6) and a sixth sensor 626 (see FIG. 7). Each of the fifth sensor 625 and the sixth sensor 626 is arranged to face the rear of the body 10. The fifth sensor 625 is mounted to the vertical frame 3L, and the sixth sensor 626 is mounted to the vertical frame 3R.

Each of the first sensor 621 to the sixth sensor 626 includes a sensor such as an image sensor (a camera), a sonar sensor, a radar, or Light Detection and Ranging (LiDAR), and detects a condition around the body 10. In the present embodiment, as an example, each of the first sensor 621 to the sixth sensor 626 is a three-dimensional sensor. The three-dimensional sensor measures a distance to each distance-measuring point (a measurement target) in a measurement range by employing a Time Of Flight (TOF) method. In the TOF method, the distance to the distance-measuring point is measured on the basis of a round-trip time of light or sound to the distance-measuring point. Examples of the surrounding condition of the body 10 include, but are not limited to, presence or absence of an object (an obstacle or the like) ahead in the advancing direction of the body 10 and the position (the distance and the azimuth) of the object.

The obstacle detector 62 further includes a front contact sensor 627 and a rear contact sensor 628. A right and left pair of the front contact sensors 627 is arranged on the front side of the body 10, and a right and left pair of the rear contact sensors 628 is arranged on the rear side of the body 10. Each of the front contact sensor 627 and the rear contact sensor 628 detects the obstacle when contacting the obstacle. Each of the sensors sends a detection signal to the controller 7 when detecting the obstacle.

The power source 63 is a drive source that supplies the power at least to the travel unit 11. The power source 63 has the engine such as a diesel engine. The power source 63 drives the hydraulic pump to supply the hydraulic oil from the hydraulic pump to the motor 112 of the travel unit 11, and the like. The power source 63 thereby drives the travel unit 11 and the like. Electronic devices such as the positioning device 2, the controller 7, and the communication device 60 are connected to the battery. Thus, these electronic devices can be operated even when the power source 63 is stopped.

The tank 64 stores the spray material such as the chemical solution. The spray material that is stored in the tank 64 is supplied to the spray device 4 and is then sprayed from the spray nozzle 41 of the spray device 4. The tank 64 can be replenished with the chemical solution, which is the spray material, from the outside. A volume of the tank 64 is approximately 200 L, for example.

The display 65 is arranged on the upper surface of the body 10. As an example, the display 65 is formed in a columnar shape that is long in the up-down direction D1. A lighting state of the display 65 varies according to an operating state (a travel state, the spraying work performing state, or the like) of the sprayer 1. Thus, the operating state of the sprayer 1 can be recognized visually from the surrounding of the sprayer 1.

The sensor device 66 includes a remaining amount sensor that detects the remaining amount of the chemical solution, which is the spray material, and the fuel remaining amount, for example. As an example, the sensor device 66 detects the remaining amount of the chemical solution from an amount of the chemical solution in the tank 64. Similarly, the sensor device 66 detects the fuel remaining amount from an amount of the fuel in the fuel tank.

The controller 7 is mainly configured to be a computer system that has, for example, one or more processors such as a central processing unit (CPU) and one or more types of memory such as read only memory (ROM) or random access memory (RAM). The controller 7 executes various types of processing (information processing). In the present embodiment, the controller 7 is an integrated controller that controls the entire sprayer 1. The controller 7 includes an electronic control unit (ECU), for example. However, the controller 7 may be provided separately from the integrated controller. The controller 7 may include the single processor or the plural processors as the main components.

As illustrated in FIG. 5, the controller 7 includes an acquisition processing unit 71, an automatic travel processing unit 72, a manual travel processing unit 73, a notification processing unit 74, an output processing unit 75, and a spray processing unit 76. In the present embodiment, as an example, the controller 7 is mainly configured to be the computer system that has the one or more processors. Thus, when the one or more processors in the controller 7 execute a control program, these plural functional units (the acquisition processing unit 71 and the like) are implemented. These plural functional units that are included in the controller 7 may separately be provided in plural casings or may be provided in a single casing.

The controller 7 can communicate with the devices that are provided in the various parts of the body 10. More specifically, at least the travel unit 11, the positioning device

2, the spray device 4, the airflow generation unit 5, the communication device 60, the user interface 61, the obstacle detector 62, the power source 63, and the display 65 are connected to the controller 7. Thus, the controller 7 can control the travel unit 11, the spray device 4, and the like and can acquire the electric signals from the positioning device 2, the communication device 60, the obstacle detector 62, and the like. The controller 7 may exchange the various types of the information (the data) with each of the devices either directly or indirectly via a relay or the like.

The controller 7 includes, in addition to the above functional units, an engine control unit, a hydro-static transmission (HST) control unit that executes control for the hydro-static continuously variable transmission, and the like. The engine control unit executes control for the engine (the power source 63). The HST control unit executes control for the hydrostatic continuously variable transmission.

The acquisition processing unit 71 executes acquisition processing to acquire the electric signal (including the data) from each of the devices. In the present embodiment, the acquisition processing unit 71 acquires a manipulation signal such as the stop instruction at least from the first manipulation terminal 210 and the second manipulation terminal 220. The acquisition processing unit 71 further acquires the manipulation signal from the manual manipulation device 8, which will be described below. In this way, with the acquisition processing unit 71, the controller 7 can acquire the manipulation signals that correspond to the manipulation of the first manipulation terminal 210, the second manipulation terminal 220, and the manual manipulation device 8, for example. Moreover, the acquisition processing unit 71 acquires the information (the data) such as the remaining amount of the chemical solution, which is the spray material, and the fuel remaining amount from the sensor device 66.

The automatic travel processing unit 72 causes the body 10 to travel automatically along the target route in the field F1 on the basis of the positioning information that is acquired from the positioning device 2, and the like. More specifically, the automatic travel processing unit 72 causes the travel unit 11 to travel automatically along the target route on the basis of the positioning information that includes the position and the orientation of the body 10 measured by the positioning device 2. For example, when the RTK positioning of the positioning information is ready, the manipulator presses (for example, presses and holds) the third manipulation unit 223 of the second manipulation terminal 220. Then, the second manipulation terminal 220 outputs a travel start instruction (a work start instruction) to the sprayer 1. Once the automatic travel processing unit 72 acquires the travel start instruction from the second manipulation terminal 220, the automatic travel processing unit 72 starts the automatic travel of the sprayer 1 on the basis of the positioning information of the body 10 that is positioned by the positioning device 2. As a result, the sprayer 1 starts traveling automatically along the target route, the spray device 4 starts the spraying work.

The manual travel processing unit 73 executes travel control processing. In the travel control processing, the travel unit 11 is controlled according to the manipulation signal that is output from the manual manipulation device 8 and is acquired by the acquisition processing unit 71. That is, by controlling the travel unit 11 with the manual travel processing unit 73, the controller 7 can control the travel unit 11, that is, can allow the manual driving of the travel unit 11 according to the manipulation of the manual manipulation device 8 by the manipulator.

The notification processing unit 74 executes notification processing by controlling the display 65, a sound output unit, and the like. For example, the notification processing unit 74 changes a lighting state of the display 65 according to an operating state (a travel state, a spraying work performing state, or the like) of the sprayer 1, and thereby notifies a person around the sprayer 1 according to the operating state of the sprayer 1.

The output processing unit 75 executes output processing to output information to the first manipulation terminal 210 or the like. For example, the output processing unit 75 can display the various types of the information on the display unit 211 of the first manipulation terminal 210 by outputting the various types of the information to the first manipulation terminal 210.

The spray processing unit 76 executes spray control processing that is related to the work (the spraying work) by the spray device 4, the airflow generation unit 5, and the like. More specifically, when the sprayer 1 starts the automatic travel at a work start position the spray processing unit 76 outputs a switch signal to the spray device 4, so as to switch the spray pattern on the basis of control information that is included in the predetermined target route. When receiving the switch signal, the spray device 4 performs the spraying work in the predetermined spray pattern.

The manual manipulation device 8 is a device for manually controlling the sprayer 1. In the sprayer 1, the controller 7 (acquisition processing unit 71) acquires the manipulation signal that is output from the manual manipulation device 8 in response to the manipulator's manipulation.

In the present embodiment, the manual manipulation device 8 is connected to the controller 7 of the sprayer 1 by a cable having a sufficient length, and communicates with the controller 7 in a wired manner. Thus, the manipulator does not have to get in the body 10 of the sprayer 1. For example, the manipulator can manually manipulate the sprayer 1 with the manual manipulation device 8 while standing around the body 10. Here, the manual manipulation device 8 may communicate with the sprayer 1 (the controller 7) by the wireless communication using the radio wave or the light. Even in this case, the manipulator can manually manipulate the sprayer 1 with the manual manipulation device 8 from the outside of the body 10. In short, the manual manipulation device 8 can be manipulated outside the body 10. Thus, for example, during loading or unloading of the sprayer 1 on or from a transport vehicle, the manipulator can manually manipulate the sprayer 1 from a safe place outside the body 10.

In the present embodiment, as illustrated in FIG. 11, the body 10 is provided with a housing unit 80 that can house the manual manipulation device 8. Then, as long as the housing unit 80 houses the manual manipulation device 8, the automatic travel processing unit 72 of the controller 7 starts the automatic travel of the sprayer 1 (the work vehicle). That is, when the manual manipulation device 8 is not in use, such as when the sprayer 1 travels automatically, the manual manipulation device 8 can be housed in the housing unit 80 of the body 10. This eliminates loss of the manual manipulation device 8, and the like. Meanwhile, when the manual manipulation device 8 is not housed in the housing unit 80, the sprayer 1 does not start the automatic travel. Thus, the manipulator can keep a habit of housing the manual manipulation device 8 in the housing unit 80 of the body 10 when the manual manipulation device 8 is not used.

More specifically, similar to the user interface 61 and the like, the housing unit 80 is provided on the second block 10R side. The user interface 61 includes: the manipulation unit

612 that accepts manipulation to make an adjustment for the work (the spraying work); and the display unit 611 that displays the information on the manipulation. For example, the display unit 611, which includes the liquid-crystal display, is arranged near the front end in an outer surface (a right surface) of the second block 10R. Below the display unit 611, the knob, the push button switch, or the like as the manipulation unit 612 is arranged. Then, the housing unit 80 is arranged further below the manipulation unit 612 in the outer surface (the right surface) of the second block 10R. The housing unit 80 is a recess that is large enough to house the manual manipulation device 8.

A contact or non-contact sensor (including a switch) is provided in the housing unit 80. The contact or non-contact sensor detects whether the manual manipulation device 8 is accommodated in the housing unit 80. A detection result by the sensor is acquired by (the acquisition processing unit 71 of) the controller 7. Only in the case where the detection result by the sensor indicates that the manual manipulation device 8 is housed in the housing unit 80, the automatic travel processing unit 72 starts the automatic travel of the sprayer 1 after acquiring the travel start instruction from the second manipulation terminal 220. That is, in the case where the detection result by the sensor indicates that the manual manipulation device 8 is not housed in the housing unit 80, the automatic travel processing unit 72 does not start the automatic travel of the sprayer 1 even after acquiring the travel start instruction from the second manipulation terminal 220.

As illustrated in FIG. 5, the manual manipulation device 8 includes a first travel manipulation unit 81, a second travel manipulation unit 82, a switching manipulation unit 83, and an indicator light 84. In the present embodiment, as an example, as illustrated in a balloon in FIG. 11, each of the first travel manipulation unit 81, the second travel manipulation unit 82, and the switching manipulation unit 83 includes any of various mechanical switches. Examples of the mechanical switch include, but are not limited to, a lever switch, a slide switch, a joystick, a seesaw switch, and a push button switch. The manual manipulation device 8 includes a circuit board therein. When the manual manipulation device 8 accepts manipulation on the first travel manipulation unit 81, the second travel manipulation unit 82, or the switching manipulation unit 83 from the manipulator, the manual manipulation device 8 outputs a manipulation signal (an electric signal) that corresponds to the manipulation. For example, when the manipulator manipulates the first travel manipulation unit 81 upward, the manual manipulation device 8 outputs a manipulation signal indicating that the first travel manipulation unit 81 has been manipulated upward.

The following manipulation assigned to the first travel manipulation unit 81, the second travel manipulation unit 82, and the switching manipulation unit 83. Manipulation to move the body 10 forward or reversely is assigned to the first travel manipulation unit 81. The first travel manipulation unit 81 includes a lever switch that is operable in the vertical direction (the up-down direction) when seen from the manipulator.

Manipulation to make the body 10 turn to the left or turn to the right is assigned to the second travel manipulation unit 82. The second travel manipulation unit 82 includes a lever switch that is operable in the horizontal direction (the right-left direction) when seen from the manipulator. Manipulation to enable a manual travel mode in which the travel unit 11 travels manually is assigned to the switching manipulation unit 83 that includes a push button switch. The indicator light 84 is an LED, for example, and is turned on when the manual travel mode is enabled.

In the present embodiment, each of the first travel manipulation unit 81 and the second travel manipulation unit 82 is a lever-type (stick-type) manipulation tool. Thus, the first travel manipulation unit 81 can accept manipulation to move the body 10 between a "neutral position" and a "forward travel position" or between the "neutral position" and a "reverse travel position", for example. Similarly, the second travel manipulation unit 82 can accept manipulation to move the body 10 between the "neutral position" and a "right turning position" or between the "neutral position" and a "left turning position". Here, when the manipulator contacts neither the first travel manipulation unit 81 nor the second travel manipulation unit 82, each of the first travel manipulation unit 81 and the second travel manipulation unit 82 returns to the "neutral position". The "forward travel position" of the first travel manipulation unit 81 is a movable limit position on the upper side when seen from the manipulator. The "reverse travel position" of the first travel manipulation unit 81 is a movable limit position on the lower side when seen from the manipulator. The "right turning position" of the second travel manipulation unit 82 is a movable limit position on the right side when seen from the manipulator. The "left turning position" of the second travel manipulation unit 82 is a movable limit position on the left side when seen from the manipulator. Thus, for example, when the manual manipulation device 8 accepts, from the manipulator, the manipulation involving the movement of the first travel manipulation unit 81 from the "neutral position" to the "forward travel position" side (that is, the upper side), the manual manipulation device 8 outputs the manipulation signal that corresponds to the manipulation amount (a movement amount of the first travel manipulation unit 81).

[3] Automatic Traveling Method

Hereinafter, a description will be made on a method for controlling the work vehicle (the sprayer 1) that is mainly executed by the controller 7, that is, an automatic traveling method with reference to FIG. 12 to FIG. 17.

The automatic traveling method according to the present embodiment is executed by the controller 7 that is mainly configured to be the computer system. Thus, in other words, the control method is embodied by an automatic traveling program for the work vehicle (the sprayer 1) (hereinafter simply referred to as an "automatic traveling program"). That is, the automatic traveling program according to the present embodiment is a computer program that causes the one or more processors to execute each of the processing related to the automatic traveling method. Such an automatic traveling program may cooperatively be executed by the controller 7, the first manipulation terminal 210, and the like, for example.

As illustrated in FIG. 5, the controller 7 that executes the automatic traveling method constitutes an automatic traveling system 100 together with the positioning device 2, the communication device 60, and the like. The automatic traveling system 100 is a system that executes processing related to the automatic travel of the work vehicle (the sprayer 1). In other words, the automatic traveling system 100 according to the present embodiment includes: the controller 7 including the automatic travel processing unit 72 and the like; the positioning device 2; and the communication device 60. However, at least one of the positioning device 2 and the communication device 60 may not be included as a component of the automatic traveling system 100. For example, the automatic traveling system 100 may not include the positioning device 2.

From the above description, the automatic traveling system 100 according to the present embodiment at least includes the automatic travel processing unit 72 (of the controller 7). The automatic travel processing unit 72 controls the travel unit 11 to cause the work vehicle (the sprayer 1) to travel automatically along the target route in the work site (the field F1). The controller 7 is mounted to the body 10 of the sprayer 1 and is one of the components of the sprayer 1. Thus, the automatic traveling system 100 constitutes the sprayer 1 as the work vehicle together with the travel unit 11, the spray device 4, and the like. In other words, the work vehicle (the sprayer 1) according to the present embodiment includes the automatic traveling system 100 and the travel unit 11 controlled by the automatic traveling system 100.

[3.1] Basic Operation

First, a description will be made on basic operation at the time when the automatic travel processing unit 72 executes automatic travel processing and thus the sprayer 1 as the work vehicle travels automatically in the field F1 as the work site.

The automatic travel processing unit 72 starts the automatic travel of the sprayer 1 in the case where the predetermined automatic travel condition is satisfied and the acquisition processing unit 71 acquires an automatic travel start instruction. The automatic travel condition include, for example, that a target route R10 (see FIG. 12) is set, that a key switch (an engine key switch) for starting the engine (the power source 63) of the sprayer 1 is ON, and that the sprayer 1 is located at a work start position Ps1 (see FIG. 12). That is, in a state where the target route R10 is set and the engine is running, when the sprayer 1 moves to the work start position Ps1 in the target route R10 by the manipulator's manual manipulation of the manual manipulation device 8, the automatic travel condition is satisfied. In this state, for example, the manipulator manipulates the third manipulation unit 223 of the second manipulation terminal 220, and the second manipulation terminal 220 then outputs the automatic travel start instruction to the sprayer 1. Consequently, the automatic travel processing unit 72 starts the automatic travel of the sprayer 1.

Figure 12:
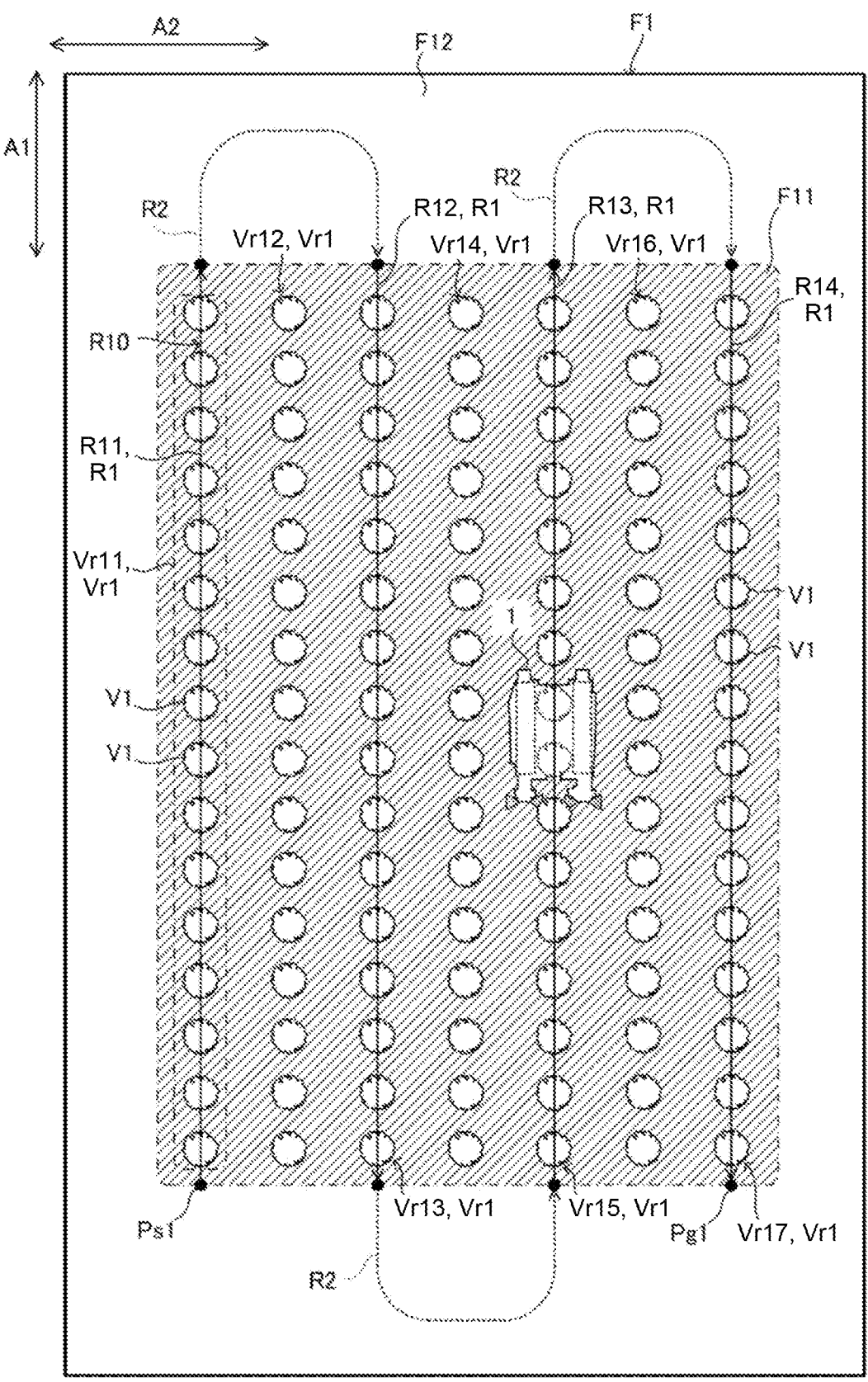
FIG. 12 is a schematic view for explaining the operation of the automatic travel by the sprayer according to the first embodiment.

As illustrated in FIG. 12, as an example, it is assumed that the work site is the field F1 where the seven crop rows Vr11 to Vr17 exist. This field F1 includes: a work area F11 (a hatched area in FIG. 12) where the crop rows Vr11 to Vr17 are formed; and a non-work area F12 that is a headland area formed around the work area F11 in a manner to surround the work area F11. In the field F1, the work area F11 is an area where the sprayer 1 performs the spraying work. The non-work area F12 is an area where the sprayer 1 does not perform the spraying work. That is, the work field (the field F1) includes: the work area F11 where the work is performed by the work vehicle (the sprayer 1); and the non-work area F12 where the work is not performed by the work vehicle (the sprayer 1).

In such a field F1, the sprayer 1 can travel automatically (travel autonomously) along the preset target route R10. For example, the sprayer 1 travels automatically along the target route R10 from the work start position Ps1 to a work end position Pg1. The target route R10 includes plural work routes R1 and plural travel routes R2. Each of the plural work routes R1 is a straight route on which the sprayer 1 performs the work (the spraying work) on the crop V1 as the work object (the spray target). Each of the plural travel routes R2 is a route (a non-work route) on which the sprayer 1 moves between the crop rows Vr1 without performing the spraying work. The plural travel routes R2 can include a turning route and a straight route.

In the example of FIG. 12, the target route R10 includes four work routes R11 to R14 in the work area F11. Each of the work routes R11 to R14 is formed along the length direction A1 that is a longitudinal direction of the crop row Vr1 (that is, a direction in which the plural crops V1 are aligned). As an example, the work route R11 is set on the crop row Vr11, the work route R12 is set on the crop row Vr13, the work route R13 is set on the crop row Vr15, and the work route R14 is set on the crop row Vr17. In the non-work area F12 that is located on each side of the work area F11 in the length direction A1, the travel route R2 is formed to connect two each of the work routes R11 to R14 that are adjacent to each other in the width direction A2. That is, basically, of the target route R10, the work route R1 is formed in the work area F11 of the work field (the field F1), and the travel route R2 is formed in the non-work area F12.

On the target route R10 described above, the sprayer 1 travels in the work area F11 from the work start position Ps1 toward one side (an upper side in FIG. 12) in the length direction A1 along the work route R11, and thereafter travels in the non-work area F12 toward a start end of the next work route R12 along the travel route R2. Then, the sprayer 1 travels in the work area F11 toward the other side (a lower side in FIG. 12) in the length direction A1 along the work route R12, and thereafter travels in the non-work area F12 toward a start end of the next work route R13 along the travel route R2. Next, the sprayer 1 travels in the work area F11 toward the one side in the length direction A1 along the work route R13, and thereafter travels in the non-work area F12 toward a start end of the next work route R14 along the travel route R2. Finally, the sprayer 1 travels in the work area F11 toward the other side in the length direction A1 along the work route R14 and travels to the work end position Pg1.

Here, it is assumed that the current position of the sprayer 1 is identified by using the position of the antenna 21 that is arranged at the center in the right-left direction D2 of the rear portion of the body 10 in the plan view. Accordingly, when the sprayer 1 travels automatically along the target route R10, the center in the right-left direction D2 of the rear portion of the body 10 passes on the target route R10. Furthermore, as described above, the sprayer 1 travels in the posture that the gate-shaped body 10 straddles the single crop row Vr1. During the travel of the sprayer 1, the sprayer 1 sprays the spray material (the chemical solution) on the crops V1 in the straddled crop row Vr1 and the crops V1 in the adjacent crop rows Vr1 to the straddled row Vr1.

Thus, for example, as illustrated in FIG. 12, the body 10 travels while straddling the crop row Vr15 during the sprayer's travel on the work route R13 that is set on the crop row Vr15. At this time, the first block 10L travels on the work path between the crop row Vr14 and the crop row Vr15, and the second block 10R travels on the work path between the crop row Vr15 and the crop row Vr16. Furthermore, at this time, the sprayer 1 can simultaneously spray the spray material (the chemical solution) on the crop V1 in the crop row Vr15, the crop V1 in the crop row Vr14 on the left side, and the crop V1 in the crop row Vr16 on the right side.

The sprayer 1 travels automatically in the predetermined row order. In the example of FIG. 12, the work route R1 is set in every other row in an arrangement order of the crop rows Vr11 including the crop rows Vr11, V13, V15, V17. Thus, the sprayer 1 travels automatically in every other row of the plural crop rows Vr1. While the sprayer 1 travels in every other row of the plural crop rows Vr1, the sprayer 1 simultaneously sprays the spray material (the chemical solution) on the spray targets (the crops V1) in the three adjacent rows in the width direction A2. This enables the spraying work on all the spray targets. However, such setting of the work routes R1 is merely an example. The sprayer 1 may travel in each row in the arrangement order of the crop rows Vr11, or may travel in every several rows.

Here, the sprayer 1 performs the spraying work while traveling on the work route R1. The sprayer 1 does not perform the spraying work while traveling on the travel route R2. Thus, the sprayer 1 starts the spraying work when starting the travel on the work route R1. Then, the sprayer 1 stops the spraying work when traveling to the terminal end of the work route R1. Then, the sprayer 1 travels on the travel route R2 while stopping the spraying work, and resumes the spraying work when reaching the start end of the next work route R1. In this way, the sprayer 1 performs the spraying work during the travel in the work area F11 and does not perform the spraying work during the travel in the non-work area F12.

In the example of FIG. 12, the travel routes R2 include the turning routes for a right gentle turn and a left gentle turn. However, a turning mode for changing the orientation of the sprayer 1 is not limited to the "gentle turn" and may include, for example, the "pivotal brake turn", the "counter-rotation turn", or the like. Furthermore, the turning mode of the sprayer 1 may include the following turning mode. In the turning mode, in order to enable turning of the body 10 in a limited space, such as a so-called "fish tail turn", the body 10 makes a turn while being switched between the forward travel and the reverse travel.

The target route R10 is generated on the basis of information such as work vehicle information on the work vehicle (the sprayer 1), field information on the field F1, and work information on the work (the spraying work herein). Examples of the work vehicle information include, but are not limited to, information on a model of the sprayer 1, information on the position of the antenna 21 in the sprayer 1, information on a type of the work machine (the spray device 4 herein), information on the size and the shape of the work machine, information on the position of the spray device 4 with respect to the body 10, and information on a vehicle speed and an engine speed during the work by the body 10. The field information includes information on the location and the shape of the field F1, information on the work start position Ps1, information on the work end position Pg1, information on the work direction, and the like. The work direction described herein means a direction in which the sprayer 1 travels while performing the spraying work in the work area F11, which is the area in the field F1 excluding the non-work area F12 such as the headland. The work information includes information on the number of skips, information on a width of the non-work area F12, and the like. The number of skips is the number of the work routes R1 that are skipped when the sprayer 1 turns in the non-work area F12.

The work vehicle information, the field information, the work information, and the like may be set manually by the manipulator when the manipulator performs manipulation to register these pieces of the information on the first manipulation terminal 210, for example. Alternatively, the information on the location and the shape of the field F1, and the like may be acquired automatically in the case where the manipulator manually manipulates the sprayer 1 to make the sprayer 1 travel around the field F1 along an outer periphery once, and transition of the position information of the antenna 21 at the time is recorded, for example.

The generated target route R10 is stored in the memory (a storage unit) of the controller in the sprayer 1, and is used for the automatic travel by the automatic travel processing unit 72. The target route R10 can be displayed on the display unit 211 of the first manipulation terminal 210, or the like.

[3.2] Stop of Automatic Travel

Next, a description will be made on processing related to "stop of the automatic travel" for stopping the sprayer 1 as the work vehicle during the automatic travel by the automatic travel processing unit 72.

That is, the automatic traveling method according to the present embodiment includes the processing to stop the sprayer 1 during the automatic travel. As an example, in the case where the remaining amount of the chemical solution as the spray material falls below a threshold value, in the case where the fuel remaining amount falls below a threshold value, or the like, it is necessary to stop the sprayer 1 and cause the manipulator to replenish the spray material (the chemical solution) or the fuel. In addition, in the case where an error that interferes with the continuation of the automatic travel occurs, the sprayer 1 also has to be stopped. An example of the error is deviation of the sprayer 1 from the target route R10 during the automatic travel. Thus, in the case where the need for stopping the sprayer 1 during the automatic travel, just as described, arises, the automatic travel processing unit 72 can interrupt (stop) the automatic travel processing of the sprayer 1 to stop the sprayer 1.

The "stop of the work vehicle during the automatic travel" in the present disclosure means to stop the operation of the travel unit 11 in the work vehicle (the sprayer 1) during the automatic travel, so as to stop the work vehicle (the sprayer 1) at a certain position, that is, to bring the work vehicle (the sprayer 1) into a stopped state. Furthermore, in the case where the work vehicle (the sprayer 1) during the automatic travel is performing the work (the spraying work herein), the operation of the spray device 4 and the airflow generation unit 5 is stopped in conjunction with the stop of the work vehicle during the automatic travel, and the work is also stopped (interrupted).

Here, a stop mode of the sprayer 1 is roughly classified into a "temporary stop" and an "emergency stop". The term "temporary stop" in the present disclosure means to stop the work vehicle (the sprayer 1) in a mode in which the travel of the work vehicle (the sprayer 1) can be resumed. The term "emergency stop" in the present disclosure means to stop the work vehicle (the sprayer 1) in a mode in which the travel of the work vehicle (the sprayer 1) cannot be resumed.

More specifically, in the case where the sprayer 1 is temporarily stopped, the travel unit 11 is temporarily stopped until a travel start instruction is made while the engine (the power source 63) is operated. Thus, in the sprayer 1 that is temporarily stopped, for example, when the acquisition processing unit 71 acquires the travel start instruction from the second manipulation terminal 220, the automatic travel processing unit 72 causes the sprayer 1 in the stopped state to resume (start) the automatic travel. Meanwhile, in the case where the sprayer 1 is stopped emergently, the engine (the power source 63) is stopped. Thus, in the sprayer 1 that is emergently stopped, for example, even when the acquisition processing unit 71 acquires the travel start instruction from the second manipulation terminal 220, the automatic travel processing unit 72 cannot cause the sprayer 1 in the stopped state to resume (start) the automatic travel. That is, the remote manipulation of the second manipulation terminal 220 or the like is not enough to restart the sprayer 1 that has been emergently stopped, and it is necessary to turn on a key switch for starting the engine of the sprayer 1 to restart the engine.

By the way, in the present embodiment, the automatic travel processing unit 72 is configured to be able to execute at least two types of processing as processing for "the temporary stop" to stop the sprayer 1 in the mode in which the travel of the sprayer 1 can be resumed. The two types of the processing are temporary stop processing and stop reservation processing. The "temporary stop processing" is processing to stop the sprayer 1 at a current position in the mode in which the travel of the sprayer 1 can be resumed in the case where a temporary stop condition is satisfied during the automatic travel of the sprayer 1. The "stop reservation processing" is processing to stop the sprayer 1 after the sprayer 1 travels in the case where a stop reservation condition is satisfied during the automatic travel of the sprayer 1. The sprayer 1 is stopped in a state where the travel of the sprayer 1 can be resumed.

That is, each of the temporary stop processing and the stop reservation processing is processing for stopping (that is, temporarily stopping) the sprayer 1 as the work vehicle in the mode in which the travel of the sprayer 1 can be resumed. In the temporary stop processing, the sprayer 1 is stopped at the position where the temporary stop condition is satisfied. Meanwhile, in the stop reservation processing, the sprayer 1 can be stopped after the sprayer 1 is moved from the position where the stop reservation condition is satisfied. In other words, the temporary stop processing is processing to temporarily stop the sprayer 1 immediately. Meanwhile, the stop reservation processing is processing to reserve the future temporary stop instead of the temporary and immediate stop of the sprayer 1.

That is, each of the temporary stop processing and the stop reservation processing is processing for stopping (that is, temporarily stopping) the sprayer 1 as the work vehicle in the mode in which the travel of the sprayer 1 can be resumed. In the temporary stop processing, the sprayer 1 is stopped at the position where the temporary stop condition is satisfied. Meanwhile, in the stop reservation processing, the sprayer 1 can be stopped after the sprayer 1 is moved from the position where the stop reservation condition is satisfied. In other words, the temporary stop processing is processing to temporarily stop the sprayer 1 immediately. Meanwhile, the stop reservation processing is processing to reserve the future temporary stop instead of the temporary and immediate stop of the sprayer 1.

Figure 13:
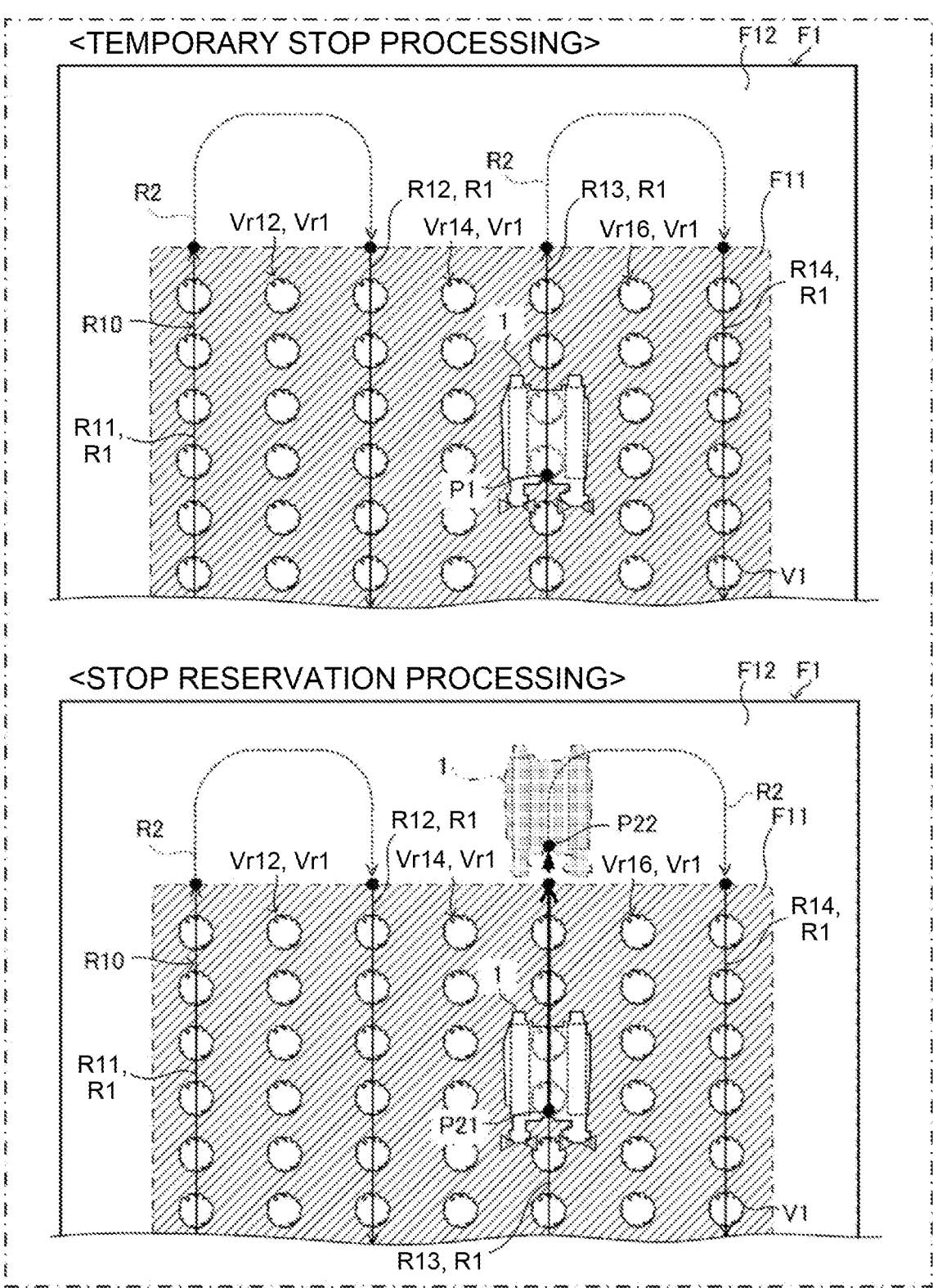
FIG. 13 includes schematic views for explaining the operation of the automatic travel by the sprayer according to the first embodiment.

Thus, for example, as illustrated in FIG. 13, when a scene in which the sprayer 1 travels automatically on a work route R13 is assumed, the temporary stop processing stops the sprayer 1 at a position P1 (that is, the current position) where the temporary stop condition is satisfied on the work route R13. Meanwhile, in the stop reservation processing, the sprayer 1 travels for a while from a position P21 where the stop reservation condition is satisfied on the work route R13. Consequently, the sprayer 1 can be stopped at a position P22 that is away from the position P21. In any of the temporary stop processing and the stop reservation processing, the travel of the sprayer 1 can be resumed from the stopped position P1 or P22. In FIG. 13, the operation of the sprayer 1 by the temporary stop processing is illustrated in an upper portion, and the operation of the sprayer 1 by the stop reservation processing is illustrated in a lower portion.

As it has been described so far, the automatic traveling method according to the present embodiment includes: causing the work vehicle (the sprayer 1) to travel automatically along the target route R10 in the work site (the field F1); executing the temporary stop processing; and executing the stop reservation processing. The temporary stop processing is the processing to stop the work vehicle (the sprayer 1) at the current position in the mode in which the travel of the work vehicle (the sprayer 1) can be resumed in the case where the temporary stop condition is satisfied during the automatic travel of the work vehicle (the sprayer 1). The stop reservation processing is the processing to stop the work vehicle (the sprayer 1) after the work vehicle (the sprayer 1) travels in the case where the stop reservation condition is satisfied during the automatic travel of the work vehicle (the sprayer 1). The work vehicle (the sprayer 1) is stopped in the state where the travel of work vehicle (the sprayer 1) can be resumed.

In this way, for example, even in the case where the stop reservation condition is satisfied while the work vehicle (the sprayer 1) performs the spraying work to spray the spray material such as the chemical solution in the work area F11 of the work site (the field F1), the work vehicle (the sprayer 1) is not stopped at the current position but can be stopped after traveling for a while. Thus, for example, in the case where the work vehicle (the sprayer 1) is stopped outside the work area F11 and the manipulator approaches the stopped work vehicle (sprayer 1), the manipulator does not have to enter the work area F11 where the spray material has been sprayed, and it is not necessary to take the countermeasure to eliminate the exposure of the manipulator to the spray material. As a result, it is possible to provide the automatic traveling method capable of avoiding the reduction in the work efficiency, which is caused by taking the countermeasure to eliminate the exposure of the manipulator to the spray material, for example, and thus capable of eliminating or minimizing the reduction in the work efficiency.

Here, in the present embodiment, the automatic travel processing unit 72 in the automatic traveling system 100 can execute the temporary stop processing and the stop reservation processing described above. That is, the automatic traveling system 100 includes the automatic travel processing unit 72 that causes the work vehicle (the sprayer 1) to travel automatically along the target route R10 in the work site (the field F1), and the automatic travel processing unit 72 can execute the temporary stop processing and the stop reservation processing.

With such a configuration, it is possible to provide the automatic traveling system 100 and the work vehicle (the sprayer 1) including the automatic traveling system 100 capable of avoiding the reduction in the work efficiency, which is caused by taking the countermeasure to eliminate the exposure of the manipulator to the spray material, for example, and thus capable of eliminating or minimizing the reduction in the work efficiency.

The automatic traveling method according to the present embodiment further includes executing emergency stop processing to stop the work vehicle (the sprayer 1) at the current position in the mode in which the travel of the work vehicle (the sprayer 1) cannot be resumed in the case where an emergency stop condition is satisfied during the automatic travel of the work vehicle (the sprayer 1). In the emergency stop processing, similarly to the temporary stop processing, the sprayer 1 is stopped at a position (the current position) where the emergency stop condition is satisfied. In other words, similar to the temporary stop processing, the emergency stop processing is processing to temporarily and immediately stopping the sprayer 1.

Such emergency stop processing differs from the temporary stop processing and the stop reservation processing in which the sprayer 1 as the work vehicle is stopped (that is, temporarily stopped) in the mode in which the travel of the sprayer 1 can be resumed. That is, in the emergency stop processing, the sprayer 1 can be stopped (that is, emergently stopped) in the mode in which the travel of the sprayer 1 cannot be resumed. Then, in order to resume the automatic travel of the sprayer 1 that has been stopped emergently, the manipulator has to directly operate the sprayer 1 to restart the engine of the sprayer 1, for example. For this reason, in the case where a trouble, such as presence of the person around the sprayer 1, that has a relatively high degree of urgency and interferes with the automatic travel of the sprayer 1 occurs, the emergency stop processing is executed to reliably stop the sprayer 1 and thus can prevent the travel of the sprayer 1 from being easily resumed.

Here, the "temporary stop condition" is a condition for the automatic travel processing unit 72 to execute the temporary stop processing. When the temporary stop condition is satisfied, the temporary stop processing is executed. The "stop reservation condition" is a condition for the automatic travel processing unit 72 to execute the stop reservation processing. When the stop reservation condition is satisfied, the stop reservation processing is executed. The "emergency stop condition" is a condition for the automatic travel processing unit 72 to execute the emergency stop processing. When the emergency stop processing is satisfied, the emergency stop processing is executed. Different conditions are set as the temporary stop condition, the stop reservation condition, and the emergency stop condition.

In the present embodiment, as an example, the temporary stop condition includes that the acquisition processing unit 71 acquires a temporary stop instruction from the second manipulation terminal 220. The stop reservation condition includes that the acquisition processing unit 71 acquires the temporary stop instruction from the first manipulation terminal 210 (hereinafter, referred to as a "first condition"). Furthermore, the stop reservation condition includes, for example, that the remaining amount of the replenishment target such as the chemical solution as the spray material or the fuel falls below the threshold value (hereinafter, referred to as a "second condition"). Just as described, the stop reservation condition includes the plural conditions. The stop reservation condition is satisfied when any of these plural conditions (the first condition and the second condition) is satisfied. The emergency stop condition includes that the acquisition processing unit 71 acquires an emergency stop instruction from the second manipulation terminal 220. In the present embodiment, it is assumed that the first manipulation terminal 210 cannot output the emergency stop instruction.

In the case where the above-described conditions are set, for example, the manipulator manipulates the first manipulation unit 221, and the second manipulation terminal 220 thereby outputs the temporary stop instruction to the sprayer 1. In such a case, the automatic travel processing unit 72 determines that the temporary stop condition is satisfied, and executes the temporary stop processing to stop the sprayer 1 at the current position.

Meanwhile, in the case where the manipulator manipulates the manipulation unit 212 on the manipulation screen that is displayed on the display unit 211, and the first manipulation terminal 210 thereby outputs the temporary stop instruction to the sprayer 1, the automatic travel processing unit 72 determines that the first condition of the stop reservation conditions is satisfied, and executes the stop reservation processing in which the sprayer 1 travels for a while before being stopped. In the case where the remaining amount of the chemical solution as the spray material falls below the threshold value, or in the case where the remaining amount of the fuel falls below the threshold value, the automatic travel processing unit 72 determines that the second condition of the stop reservation conditions is satisfied, and executes the stop reservation processing in which the sprayer 1 travels for a while before being stopped.

In the case where the manipulator manipulates a second manipulation unit 222, and the second manipulation terminal 220 thereby outputs the emergency stop instruction to the sprayer 1, the automatic travel processing unit 72 determines that the emergency stop condition is satisfied, and executes the emergency stop processing to stop the sprayer 1 at the current position.

Accordingly, which of the stop reservation processing and the temporary stop processing is to be executed is determined, for example, depending on which of the first manipulation terminal 210 and the second manipulation terminal 220 the manipulator manipulates to stop (that is, temporarily stop) the sprayer 1 in the mode in which the travel of the sprayer 1 can be resumed. Thus, for example, according to the degree of urgency, the manipulator can determine from which of the first manipulation terminal 210 and the second manipulation terminal 220 the temporary stop instruction is output. As an example, in the case where the sprayer 1 can continue traveling for a while such as in a work break, prohibition of the entry of the manipulator into the work area F11 can be prioritized. Then, the stop reservation processing is executed to cause the sprayer 1 to travel for a while without stopping the sprayer 1 at the current position. Meanwhile, in the case where the error, such as the deviation of the sprayer 1 from the target route R10 during the automatic travel, that interferes with the continuation of the automatic travel occurs, the temporary stop processing can be executed to stop the sprayer 1 at the current position.

In the present embodiment, in particular, the first manipulation terminal 210 communicates with the sprayer 1 via the communication network N1. Thus, compared to the second manipulation terminal 220 that directly communicates with the sprayer 1 in the wireless manner, a time lag or the like is likely to occur in the communication. However, even in the case where the stop reservation processing is executed to cause the sprayer 1 to travel for a while before being stopped, the manipulator is less likely to feel uncomfortable about the manipulation of the first manipulation terminal 210 for the temporary stop. Meanwhile, when the manipulator manipulates the second manipulation terminal 220, which is manipulated at the position where the manipulator can visually recognize the sprayer 1, for the temporary stop, the temporary stop processing is executed to stop the sprayer 1 immediately. Thus, the manipulator is less likely to feel uncomfortable about the manipulation of the second manipulation terminal 220 for the temporary stop.

In the case where the remaining amount of the chemical solution as the spray material falls below the threshold value, or in the case where the remaining amount of the fuel falls below the threshold value, the stop reservation processing is executed to cause the sprayer 1 to travel for a while before stopping the sprayer 1 automatically without relying on the manipulation by the manipulator. Thus, in the case where the replenishment target such as the chemical solution or the fuel has to be replenished, the sprayer 1 can be stopped reliably before the remaining amount of the replenishment target becomes zero (0).

Hereinafter, a further detailed description will be made on the stop reservation processing. In the present embodiment, as illustrated in the lower portion of FIG. 13, in the stop reservation processing, when the stop reservation condition is satisfied in the work area F11, the work vehicle (the sprayer 1) is made to travel to a non-work area F12 and is then stopped. That is, in the example illustrated in FIG. 13, the sprayer 1, which travels on the work route R13 set in the work area F11, at least travels until leaving the work area F11, and is then stops. The sprayer 1 may be stopped after traveling to the non-work area F12. For example, the sprayer 1 may be stopped immediately after reaching the non-work area F12, or may further travel in the non-work area F12 before being stopped. Just as described, in the stop reservation processing, the sprayer 1 is stopped outside the work area F11. Thus, even in the case where the manipulator approaches the stopped sprayer 1, the manipulator does not have to enter the work area F11 where the spray material has been sprayed.

Here, in the present embodiment, in the stop reservation processing, in the case where the stop reservation condition is satisfied and the sprayer 1 thereafter travels, the automatic travel processing unit 72 causes the sprayer 1 to travel automatically along the target route R10. That is, the automatically traveling sprayer 1 continues the automatic travel along the target route R10 from the position where the stop reservation condition is satisfied to the position where the sprayer 1 is stopped by the stop reservation processing. Thus, in the example illustrated in FIG. 13, when the stop reservation condition is satisfied at the position P21 on the work route R13, the sprayer 1 travels on the work route R13 from the position P21 to an end of the work route R13, and further travels on the travel route R2, which is connected to the work route R14, until being stopped at the position P22 on the travel route R2. In addition, since the sprayer 1 performs the spraying work during the automatic travel on the work route R1, the sprayer 1 continues the spraying work from the position P21 to the end of the work route R13, and stops the spraying work at the end of the work route R13.

Thus, the threshold value of the replenishment target (each of the spray material and the fuel) as the second condition of the stop reservation conditions is at least set with a margin for continuation of the travel and the work (the spraying work) of the sprayer 1 until leaving of the sprayer 1 from the work area F11. In practice, in order to replenish any of these replenishment targets after the stop of the sprayer 1 by the stop reservation processing, the manipulator manually manipulates and moves the sprayer 1 to a replenishment position that is set around the field F1, for example. Thus, the threshold value of the fuel is particularly set with the margin for allowing the continuation of the travel of the sprayer 1 to the replenishment position.

In the automatic traveling method according to the present embodiment, for example, the manipulator can select (designate) a stop position of the sprayer 1 by the stop reservation processing on a setting screen of the first manipulation terminal 210, or the like. As described above, the manipulator may also select whether to set the stop position in the non-work area F12.

Figure 14:
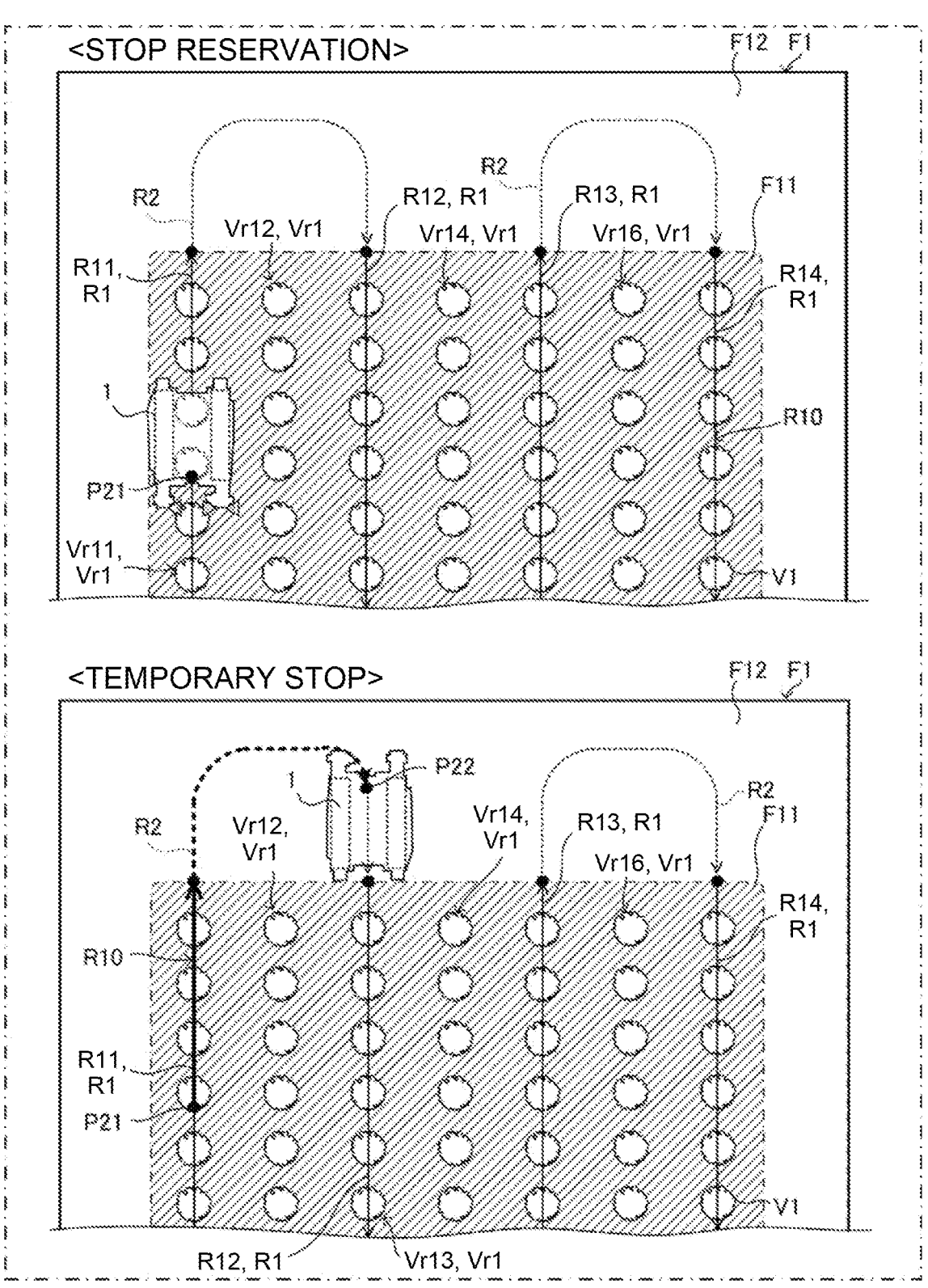
FIG. 14 includes schematic views for explaining operation related to a stop reservation of the sprayer according to the first embodiment.

An example of the selectable stop position is, as illustrated in FIG. 14, a position behind a work start (restart) position at the time of resuming the travel. More specifically, in the case where the stop reservation condition is satisfied when the sprayer 1 is located at the position P21 on a work route R11 as illustrated in the upper portion of FIG. 14, it is possible to set the stop position (the position P22) behind a work route R12 following the work route R11 as illustrated in the lower portion of FIG. 14. In the example illustrated in FIG. 14, when the stop reservation condition is satisfied at the position P21 on the work route R11, the sprayer 1 travels on the work route R11 from the position P21 to the end of the work route R11, and further travels on the travel route R2, which is connected to the work route R12, until being stopped at the position P22 on the travel route R2. Here, in the advancing direction of the sprayer 1, the position P22 is located right in front of a start end of the work route R12 as the work start (restart) position at the time of resuming the travel.

In short, in the example illustrated in FIG. 14, in the case where the work vehicle (the sprayer 1) travels to the non-work area F12 and is then stopped in the stop reservation processing, the work vehicle (the sprayer 1) is stopped at the position P22 that corresponds to the work start position at the time of resuming the travel in the work area F11. Just as described, the sprayer 1 is stopped at the position P22, which corresponds to the work start position at the time of resuming the travel after the temporary stop. Thus, the manipulator can clearly identify the crop row Vr1 as the next work target. For this reason, for example, even in the case where the sprayer 1 is stopped by the stop reservation processing for a purpose of replenishing the replenishment target (any of the spray material and the fuel), and the manipulator thereafter manually manipulates and moves the sprayer 1 to the replenishment position, the manipulator can easily comprehend the position to which the sprayer 1 should return at the time of resuming the automatic travel. If necessary, the manipulator may mark the position P22, at which the sprayer 1 is stopped, when manually manipulating the sprayer 1.

That is, in the work, such as the spraying work, in which it is difficult to visually determine to what extent the work is completed, it may be difficult for the manipulator to identify the work start position at the time of resuming the travel. However, in the present embodiment, since the work start position is clear, the travel can easily be resumed. For example, in the case where a map including the target route R10 is displayed on the display unit 211 of the first manipulation terminal 210, the work start position at the time of resuming the travel can be checked. However, it is unnecessary to check such a map.

Figure 15:
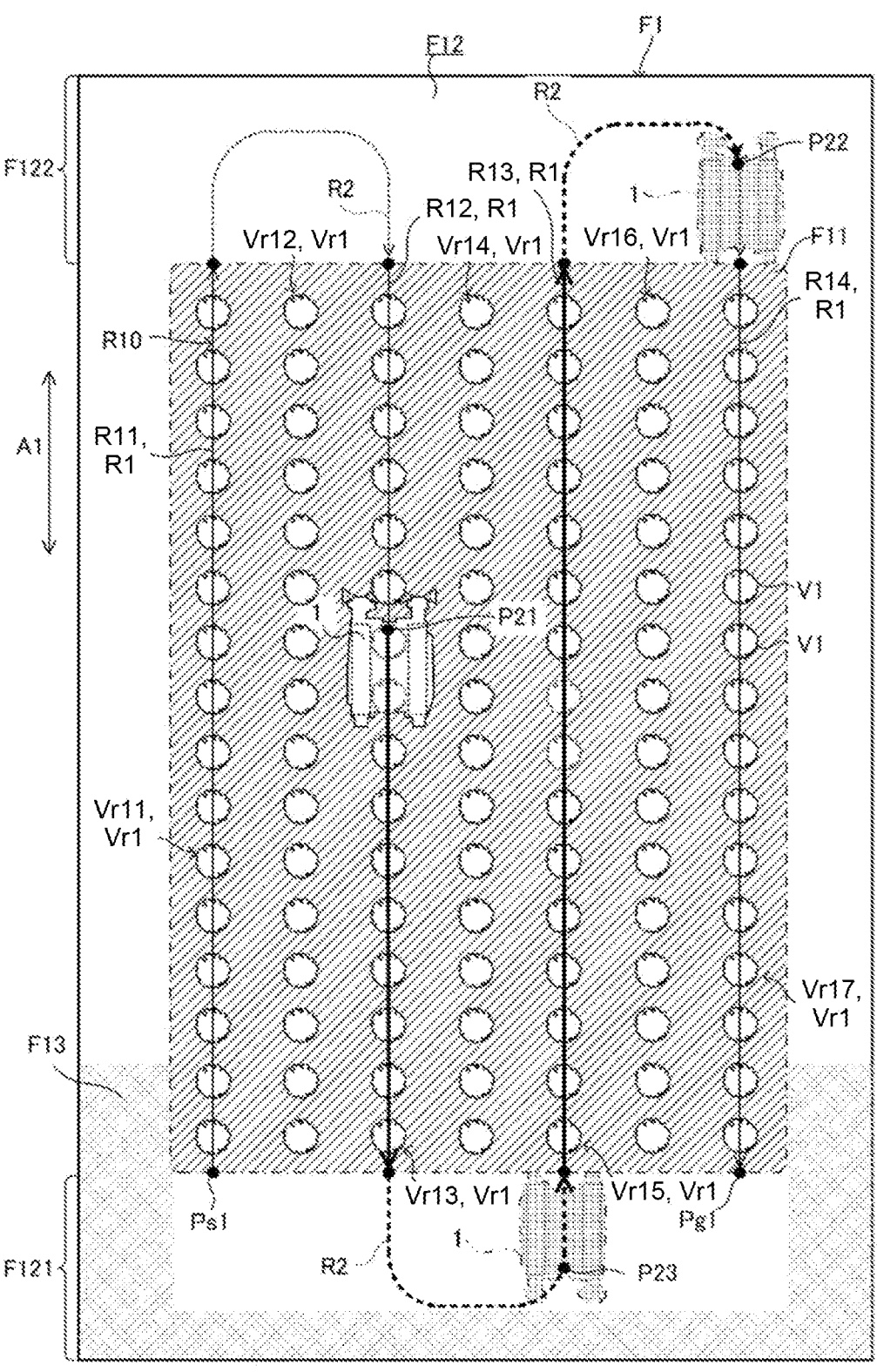
FIG. 15 is a schematic views for explaining the operation related to the stop reservation of the sprayer according to the first embodiment.

Another example of the selectable stopping position is, as shown in FIG. 15, a position outside a stop prohibition area F121 that is set appropriately in the field F1 as the work site. That is, the automatic traveling method according to the present embodiment further includes setting the stop prohibition area F121, where the work vehicle (the sprayer 1) is not stopped, in the work site (the field F1) in the stop reservation processing. By setting the stop prohibition area F121, in the stop reservation processing, the sprayer 1 is stopped at the position P22 outside the stop prohibition area F121 in the field F1. For example, the manipulator appropriately sets the stop prohibition area F121 with the first manipulation terminal 210.

In the example illustrated in FIG. 15, of a headland as the non-work area F12, the headland on one side (a lower side in FIG. 15) in the length direction A1 is surrounded by a no-entry area F13 for the person. Thus, the headland that is located on the one side in the length direction A1 and is surrounded by the no-entry area F13 for the person is set as the stop prohibition area F121. In the example illustrated in FIG. 15, when the stop reservation condition is satisfied at the position P21 on the work route R12, the sprayer 1 travels on the work route R12 from the position P21 to the end of the work route R12, and further travels on the travel route R2, which is connected to the work route R13. Here, since the position P23 on the travel route R2 is included in the stop prohibition area F121, the sprayer 1 is not stopped at the position P23 and travels on the work route R13 to the end of the next work route R13. The sprayer 1 further travels on the travel route R2 until being stopped at the position P22 on the travel route R2 that is connected to the work route R14. Here, the position P22 is included in a stoppable area F122 that is the headland on the other side (an upper side in FIG. 15) in the length direction A1 of the headland as the non-work area F12. Thus, the sprayer 1 is stopped at the position P22.

Just as described, the stop prohibition area F121 can be set in the work site (the field F1). Thus, it is possible to avoid the sprayer 1 from being stopped in an area where the manipulator cannot enter (without passing through the work area F11) by the stop reservation processing. As a result, it is possible to further improve the work efficiency by designating the area where the temporary stop is not permitted.

The automatic traveling method according to the present embodiment further includes making a notification in conjunction with the stop reservation processing. The "notification" herein means, for example, a certain type of a warning, the notification, or the like is given to the manipulator or another person, and includes the notifications by the display 65, the sound output unit, and the like. That is, when the automatic travel processing unit 72 executes the stop reservation processing, the notification processing unit 74 makes the notification by controlling the display 65, the sound output unit, and the like. In this way, for example, it is possible to notify the manipulator or another person of an execution state of the stop reservation processing.

More specifically, the notification is made in at least one of a first time point at which the stop reservation condition is satisfied, a second time point at which the work vehicle (the sprayer 1) is stopped, and a period from the first time point to the second time point. That is, the notification that is associated with the stop reservation processing is made in at least at one of the first time point at which the temporary stop of the sprayer 1 is reserved, the second time point at which the sprayer 1 is actually temporarily stopped, and the period therebetween.

In the present embodiment, as an example, the notification processing unit 74 controls the display 65, the sound output unit, and the like that are mounted on the body 10, and makes the notification to the surroundings of the body 10 in the period from the first time point at which the stop reservation condition is satisfied to the second time point at which the sprayer 1 is actually stopped. In this way, it is possible to notify the person around the sprayer 1 that the sprayer 1 will be stopped soon. Furthermore, in the present embodiment, at the second time point, the notification processing unit 74 transmits a notification signal to the first manipulation terminal 210, and the first manipulation terminal 210 notifies the manipulator that the sprayer 1 has been stopped. As a result, for example, the manipulator at a position away from the field F1 can be notified that the sprayer 1 has temporarily been stopped.

The automatic traveling method according to the present embodiment further includes outputting which of the plural conditions included in the stop reservation conditions is satisfied. An "output" mode herein includes, for example, transmission to an external terminal (the first manipulation terminal 210 or the like) by communication, display, audio output, recording, printing, and the like. In the present embodiment, as an example, the output processing unit 75 transmits, to the first manipulation terminal 210, whether the temporary stop instruction has been acquired from the first manipulation terminal 210 (the first condition), whether the remaining amount of the chemical solution as the spray material has fallen below the threshold value (the second condition), or whether the fuel remaining amount has fallen below the threshold value (the second condition). In this way, the first manipulation terminal 210 can present, to the manipulator, an event causing the execution of the stop reservation processing by the display or the like. Thus, the manipulator can promptly take a necessary measure, such as the replenishment of the spray material or the fuel, on the sprayer 1 that has been temporarily stopped by the stop reservation processing.

Figure 16:
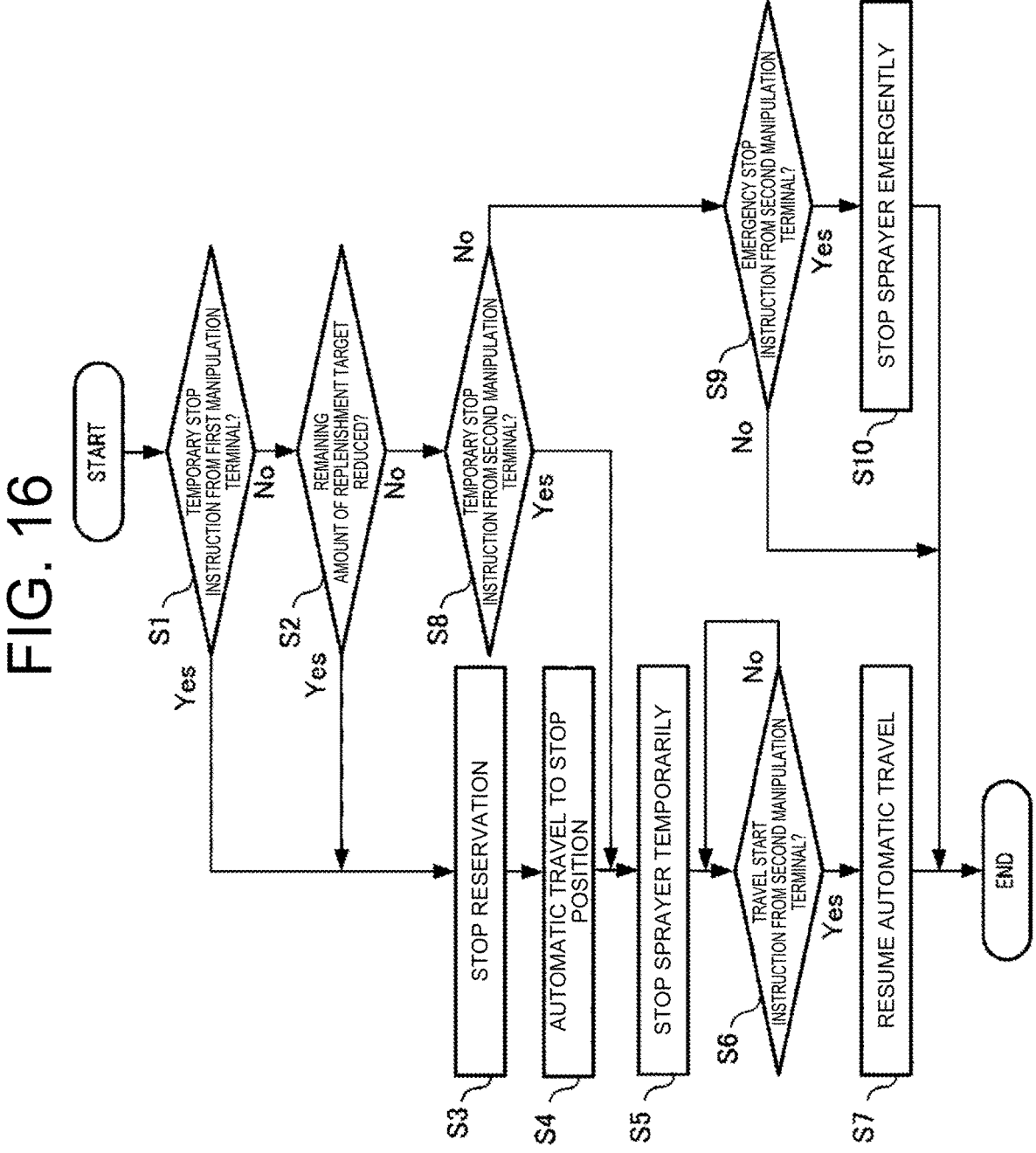
FIG. 16 is a flowchart illustrating an automatic traveling method according to the first embodiment, in particular, an example of processing related to a stop of the automatic travel.

FIG. 16 is a flowchart illustrating the automatic traveling method according to the present embodiment, in particular, an example of the processing related to the stop of the automatic travel.

That is, the automatic travel processing unit 72 determines whether the temporary stop instruction has been acquired from the first manipulation terminal 210 during the automatic travel of the sprayer 1 as the work vehicle (S1). If the manipulator performs the temporary stop manipulation on the first manipulation terminal 210, the acquisition processing unit 71 acquires the temporary stop instruction from the first manipulation terminal 210 (S1: Yes), and thus the processing proceeds to step S3.

If the acquisition processing unit 71 does not acquire the temporary stop instruction from the first manipulation terminal 210 (S1: No), the automatic travel processing unit 72 determines presence or absence of the reduction in the remaining amount of the spray material (the chemical solution) or the fuel as the replenishment target (S2). If the remaining amount of the spray material (the chemical solution) falls below the threshold value, or the remaining amount of the fuel falls below the threshold value, the automatic travel processing unit 72 determines the reduction in the remaining amount of the replenishment target (S2: Yes), and the processing proceeds to step S3.

In step S3, the automatic travel processing unit 72 determines that the stop reservation condition is satisfied, and starts the stop reservation processing. When the stop reservation processing is started, the automatic travel processing unit 72 does not stop the sprayer 1 at the current position but causes the sprayer 1 to travel automatically to the appropriate stop position (S4). When the sprayer 1 reaches the stop position, the automatic travel processing unit 72 temporarily stops the sprayer 1 (S5), and the processing proceeds to step S6.

In step S6, it is determined whether the travel start instruction has been acquired from the second manipulation terminal 220. If the manipulator long-presses the third manipulation unit 223 of the second manipulation terminal 220 and performs the manipulation to resume the travel (the same manipulation as the manipulation to start the travel), the acquisition processing unit 71 acquires the travel start instruction from the second manipulation terminal 220 (S6: Yes). Thus, the automatic travel processing unit 72 resumes the automatic travel of the sprayer 1 (S7).

Until the manipulator long-presses the third manipulation unit 223 of the second manipulation terminal 220 and performs the manipulation to resume the travel, the travel start instruction is not output from the second manipulation terminal 220 (S6: No). Thus, the automatic travel processing unit 72 repeatedly executes the processing in step S6. As a result, the automatic travel of the sprayer 1 is not resumed, and the sprayer 1 remains stopped.

On the other hand, if the temporary stop instruction is not output from the first manipulation terminal 210 (S1: No), and the remaining amount of the replenishment target is not reduced (S2: No), the automatic travel processing unit 72 determines whether the temporary stop instruction has been acquired from the second manipulation terminal 220 (S8). If the manipulator presses the first manipulation unit 221 of the second manipulation terminal 220 and performs the manipulation for the temporary stop, the acquisition processing unit 71 acquires the temporary stop instruction from the second manipulation terminal 220 (S8: Yes). Thus, the processing proceeds to step S5. That is, in this case, since the processing in steps S3, S4 is skipped, the automatic travel processing unit 72 temporarily stops the sprayer 1 at the current position (S5).

On the other hand, if the temporary stop instruction has not been acquired from the second manipulation terminal 220 (S8: No), the automatic travel processing unit 72 determines whether the emergency stop instruction has been acquired from the second manipulation terminal 220 (S9). If the manipulator presses the second manipulation unit 222 of the second manipulation terminal 220 and performs the manipulation for the emergency stop, the acquisition processing unit 71 acquires the emergency stop instruction from the second manipulation terminal 220 (S9: Yes). Thus, the automatic travel processing unit 72 emergently stops the sprayer 1 at the current position (S10). If the emergency stop instruction has not been acquired from the second manipulation terminal 220 (S9: No), the automatic travel processing unit 72 terminates a series of the processing while the automatic travel of the sprayer 1 is continued.

During the automatic travel of the sprayer 1 as the work vehicle, the automatic travel processing unit 72 repeatedly executes the processing in steps S1 to S10. However, the flowchart illustrated in FIG. 16 is merely one example. The processing may appropriately be added or omitted, and the order of the processing may appropriately be changed.

[3.3] Other Functions

The automatic traveling method according to the present embodiment includes the following processing related to the manipulation at the time when the sprayer 1 enters the work route R1. The target route R10 includes the work route R1 and the travel route R2 as described above. Thus, in the case where the sprayer 1 automatically travels along the target route R10, the sprayer 1 travels from the travel route R2 to the work route R1, and enters the new work route R1 at the time.

Figure 17:
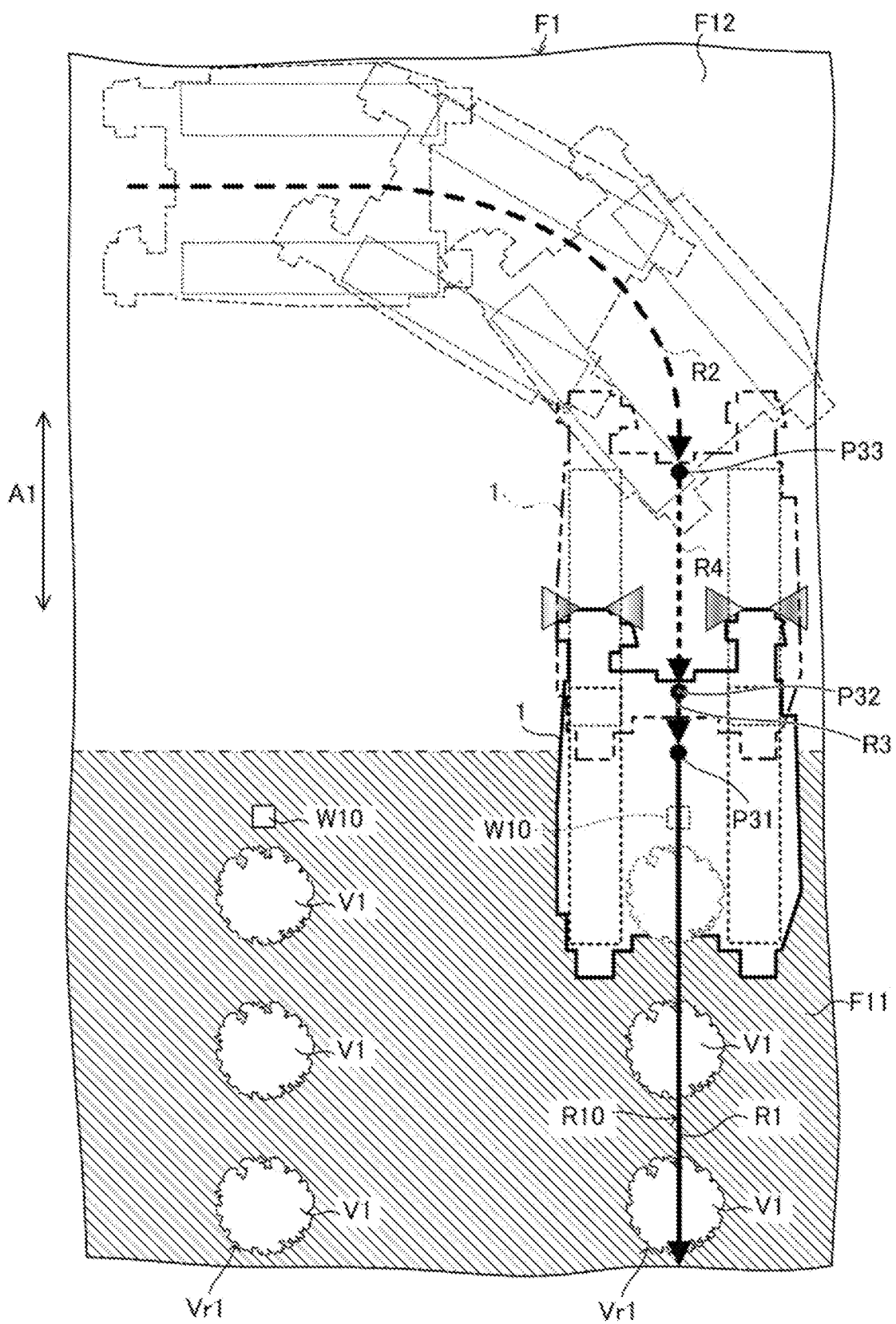
FIG. 17 is a schematic view for explaining operation at the time when the sprayer according to the first embodiment enters a work route.

For example, as illustrated in FIG. 17, the target route R10 includes the work route R1 and a spare route R3. The work route R1 is a route along which the work vehicle (the sprayer 1) performs the work on the work target (the crop row Vr1). The spare route R3 is a route that is set from a spare position P32 in front of a start end position P31 of the work route R1 to the start end position P31. In the automatic traveling method, the work vehicle (the sprayer 1) starts the work on the spare route R3. FIG. 17 schematically illustrates the manipulation of the sprayer 1 at the time when the sprayer 1 enters the work route R1.

In the example illustrated in FIG. 17, the spare position P32 is set at a position that is shifted to a front side (an upstream side) of the target route R10 from the start end position P31 of the work route R1 by a predetermined distance. The start end position P31 is set on a boundary between the work area F11 and the non-work area F12 in the field F1 as the work site. Then, for example, when the position of the antenna 21, which is arranged in the rear portion of the body 10, reaches the spare position P32 as a start end of the spare route R3, the automatic travel processing unit 72 causes the sprayer 1 to start the work (the spraying work).

On the other hand, in a comparative example, in the case where the sprayer 1 travels automatically on the target route R10, and the position of the antenna 21 reaches the start end position P31 of the work route R1, the sprayer 1 starts the work. That is, in this comparative example, the sprayer 1 starts the work only after the sprayer 1 moves from the non-work area F12 to the work area F11. In the automatic traveling method according to the present embodiment, compared to such a comparative example, work start timing by the sprayer 1 can be advanced by offsetting the work start position of the sprayer 1 to the near side (the upstream side) of the target route R10.

Thus, in the automatic traveling method according to the present embodiment, for example, even in the case where the time lag occurs in a period from the start of the operation of the spray device 4 or the airflow generation unit 5 to the stable operation thereof, the time lag can be reduced (or eliminated) by advancing the work start timing by the sprayer 1. As a result, a problem such as uneven spraying caused by the time lag is less likely to occur. That is, it is possible to minimize or eliminate unevenness of the work (spraying) or the like by the sprayer 1 on the entire crop row Vr1 as the work target. Here, the spare position P32 is preferably set in consideration of a time (the time lag) that is required for the spray device 4, the airflow generation unit 5, and the like to be operated stably, so that the spraying work can be started in front of the crop row Vr1.

Furthermore, in the case where the field F1 as the work site is an orchard such as a vineyard, in order to fix the crop row Vr1 with piles, a wire (a branch line) W10 may be stretched obliquely from the piles at both ends in an arrangement direction (the length direction A1) of the crop row Vr1. In such a case, in order to avoid contact between the wire W10 and the body 10, the automatic travel has to be made in consideration of a position of the wire W10.

For this reason, in the present embodiment, as exemplified in FIG. 17, the target route R10 further includes an introduction route R4 that is set between (the end of) the travel route R2 and (the start end of) the work route R1. The introduction route R4 is a linear route that extends from the end of the travel route R2 along an extending direction of the work route R1 (here, the length direction A1). The sprayer 1 does not perform the work while automatically traveling on the introduction route R4.

More specifically, in FIG. 17, the target route R10 includes the work route R1, the travel route R2, the spare route R3, and the introduction route R4. The introduction route R4 is set from a position P33 as a start end of the target route R10 (that is, the end of the travel route R2) to the spare position P32.

The target route R10 includes such an introduction route R4 that differs from the work route R1 and the travel route R2. Then, when the sprayer 1 travels on the introduction route R4, a posture (an orientation) of the sprayer 1 at the time of entering the work route R1 is stabilized, and the body 10 straddles the wire W10 in the same manner as the crop row Vr1. This minimizes or eliminates the contact between the body 10 and the wire W10 and thus can suppress damage to both of the body 10 and the crop row Vr1.

Such operation at the time of entering the work route R1 can be applied not only when the sprayer 1 travels automatically along the target route R10, but also when the sprayer 1 that has temporarily been stopped resumes the automatic travel, for example.

[4] Modified Examples

Modified examples of the first embodiment will be listed below. The modified examples, which will be described below, may appropriately be combined for implementation.

The controller 7 according to the present disclosure includes the computer system. The computer system mainly includes, as the hardware, the one or more processors and the one or more types of the memory. The function as the controller 7 in the present disclosure is implemented when the processor executes the program that is recorded in the memory of the computer system. The program may be recorded in the memory of the computer system in advance, may be provided through an electric communication line, or may be provided in the form of a non-transitory recording medium, such as a memory card, an optical disc, or a hard disk drive, that is readable by the computer system. In addition, at least one of the functional units included in the controller 7 may include an electronic circuit.

The consolidation of at least some of the functions of the controller 7 into the single casing is not an essential configuration of the controller 7. The components of the controller 7 may separately be provided in the plural casings. On the contrary, the functions that are separately provided to the plural devices (for example, the controller 7 and the first manipulation terminal 210) may be integrated in the single casing for the controller 7. Furthermore, at least some of the functions of the controller 7 may be implemented by a cloud (cloud computing) or the like.

The sprayer 1 may be used for the work at the work sites that are not limited to the orchard such as the vineyard or the apple orchard but also include another type of the field F1 and the work site other than the field F1. The spray material that is sprayed by the sprayer 1 is not limited to chemical solution, and may be water, the fertilizer, a disinfectant solution, another type of the solution, powder, or the like, for example. Similarly, the spray target on which the spray material is sprayed is not limited to the grape tree, and may be another type of the crop or an object other than the crop (including an inorganic matter). The sprayer 1 is not limited to an unmanned machine that is operated by the automatic operation. The sprayer 1 may be configured to be operated by the manipulation (including the remote operation) by the person (the manipulator). For example, the sprayer 1 may be of a passenger type (a manned machine) that the manipulator can get in. Also, in this case, the sprayer 1 is provided with the antenna 21 and the like in order to grasp the current position of the sprayer 1.

In the stop reservation processing, in the case where the stop reservation condition is satisfied and the sprayer 1 thereafter travels, it is not essential for the automatic travel processing unit 72 to cause the sprayer 1 to travel automatically along the target route R10. For example, in the case where the stop reservation condition is satisfied and the sprayer 1 thereafter travels, the automatic travel processing unit 72 may cause the sprayer 1 to travel along an evacuation route that is set separately from the target route R10. As an example, the evacuation route is a route for moving the sprayer 1 to the replenishment position of the spray material, the replenishment position of the fuel, or the like.

In addition, in the stop reservation processing, in the case where the stop reservation condition is satisfied, the sprayer 1 only needs to be stopped (temporarily stopped) after traveling. Thus, it is not essential to cause the sprayer 1 to travel to the non-work area F12. That is, in the stop reservation processing, the sprayer 1 may be stopped (temporarily stopped) after the sprayer 1 travels for a predetermined time or the predetermined distance from the time point at which the stop reservation condition is satisfied, for example.

The support frame 3 only needs to be attached to the one end portion in the front-rear direction D3 of the body 10, and may be attached to the front portion of the body 10. In this case, the work unit (the spray nozzle 41) that is supported by the support frame 3 is also arranged not in the rear portion but in the front portion of the body 10.

The sprayer 1 may include a pair of the spray devices 4 aligned in the front-rear direction D3. In this way, the sprayer 1 can perform the work (the spraying work) with each of the paired spray devices 4 (work devices) aligned in the front-rear direction D3. As a result, the work efficiency can be improved when compared to the case where the work is performed only with any one of the spray devices 4. The sprayer 1 may further include a rotational drive device that generates rotary power to rotate the support frame 3 about the rotation axis Ax1 with respect to the body 10.

The body 10 only needs to have the first block 10L and the second block 10R aligned in the right-left direction D2, and the arrangement of the first block 10L and the second block 10R may be reversed in the right-left direction D2. In detail, the first block 10L that is provided with the power source 63 and the like may be located on the right side while the second block 10R that is provided with the user interface 61 and the like may be located on the left side.

The travel unit 11 is not limited to the crawler-type travel device and may be configured to have one or more wheels and travel with rotation of the one or more wheels. In addition, the configuration of the travel unit 11 is not limited to the configuration that the travel unit 11 is driven by the hydraulic motor. The travel unit 11 may be configured to be driven by an electric motor, for example.

The sprayer 1 is not limited to the air-assisted sprayer as in the first embodiment. For example, the sprayer 1 may be of an electrostatic spraying type, a type combining the air-assisting type and the electrostatic spraying type, or the like. In the case where the sprayer 1 is of the electrostatic spraying type, the airflow generation unit 5 can be omitted.

The power source 63 is not limited to the engine. The power source 63 may have a motor (an electric motor), for example, or may be a hybrid power source including the engine and the motor.

The sprayer 1 may be in a mode that the body 10 does not have the gate shape, but the entire body 10 travels (on the work path) between the pair of the adjacent crop rows Vr1. In this case, the sprayer 1 travels on each of the work paths without straddling the crop row Vr1. Also, in this case, the spray device 4 performs the spraying work by switching the spray pattern among the spray pattern in which the spray device 4 sprays the chemical solution on both of the crop rows Vr1 in the right-left direction D2, the spray pattern in which the spray device 4 sprays the chemical solution only on the left crop row Vr1, and the spray pattern in which the spray device 4 sprays the chemical solution only on the right crop row Vr1.

Each of the antennas 21, 22 is not limited to the position identification antenna and may be a wireless communication antenna, for example. Furthermore, each of the antennas 21, 22 is not limited to the receiving antenna and may be a sending antenna or a receiving/sending antenna.

The user interface 61 may have, in addition to or instead of the display unit 611, a unit that presents the information to the user by outputting voice or the like, for example. Furthermore, at least one of the adjustment items (the flow rate, the pressure, and the like) may automatically be adjusted by the controller by using the manipulation unit 612 of the user interface 61. In this case, the manipulation unit 612 can appropriately be omitted, and the user interface 61 may only display the adjustment result on the display unit 611.

Similarly, the configuration of each of the first manipulation terminal 210 and the second manipulation terminal 220 is not limited to that in the first embodiment. For example, each of the first manipulation terminal 210 and the second manipulation terminal 220 may be configured to output the temporary stop instruction and the like in response to the manipulation signal from the pointing device, such as the keyboard or the mouse, the voice input, the gesture input, or another terminal.

In addition, in the first embodiment, the description has been made on the sprayer 1 as the example of the work vehicle. However, the work vehicle is not limited to the sprayer 1. For example, the work vehicle may be a plucking machine. In this case, a plucking unit that performs plucking work is an example of the work unit and is supported by the support frame 3.

SUPPLEMENTARY NOTES OF INVENTION

Hereinafter, the summary of the invention extracted from the above-described embodiment will be supplemented. Note that each configuration and each processing function described in the supplementary notes below may be selected, omitted, or combined as appropriate.

Supplementary Note 1

An automatic traveling method includes: causing a work vehicle to travel automatically along a target route in a work site; executing temporary stop processing to stop the work vehicle at a current position in a mode in which travel of the work vehicle can be resumed when a temporary stop condition is satisfied during automatic travel of the work vehicle; and executing stop reservation processing to cause the work vehicle to travel and thereafter stop the work vehicle in a state where the travel of the work vehicle can be resumed when a stop reservation condition is satisfied during the automatic travel of the work vehicle.

Supplementary Note 2

The automatic traveling method according to Supplementary Note 1 further includes: executing emergency stop processing to stop the work vehicle at the current position in a mode in which the travel of the work vehicle cannot be resumed when an emergency stop condition is satisfied during the automatic travel of the work vehicle.

Supplementary Note 3

The automatic traveling method according to Supplementary Note 1 or 2, in which the work site includes: a work area where the work vehicle performs work; and a non-work area where the work vehicle does not perform the work, and, in the stop reservation processing, when the stop reservation condition is satisfied in the work area, the work vehicle travels to the non-work area and is thereafter stopped.

Supplementary Note 4

The automatic traveling method according to Supplementary Note 3, in which, in the stop reservation processing, in the case where the work vehicle travels to the non-work area and is thereafter stopped, the work vehicle is stopped at a position that corresponds to a work start position at the time of resuming the travel in the work area.

Supplementary Note 5

The automatic traveling method according to any one of Supplementary Notes 1 to 4 further includes: setting a stop prohibition area where the work vehicle is not stopped in the work area in the stop reservation processing.

Supplementary Note 6

The automatic traveling method according to any one of Supplementary Notes 1 to 5 further includes: making a notification in conjunction with the stop reservation processing.

Supplementary Note 7

The automatic traveling method according to Supplementary Note 6, in which the notification is made in at least one of a first time point at which the stop reservation condition is satisfied, a second time point at which the work vehicle is stopped, and a period from the first time point to the second time point.

Supplementary Note 8

The automatic traveling method according to any one of Supplementary Notes 1 to 7 further includes: outputting which of plural conditions included in the stop reservation conditions is satisfied.

Supplementary Note 9

The automatic traveling method according to any one of Supplementary Notes 1 to 8, in which the target route includes: a work route on which the work vehicle performs work on a work target; and a spare route that is set from a spare position in front of a start end position of the work route to the start end position, and the work vehicle starts the work on the spare route.

Supplementary Note 10

An automatic traveling program for causing one or more processors to execute the automatic traveling method according to any one of Supplementary Notes 1 to 9.

REFERENCE SIGNS LIST 1 sprayer (work vehicle)
11 travel unit
72 automatic travel processing unit
100 automatic traveling system
F field (work site)
F11 work area
F12 non-work area
F121 stop prohibition area
Ps1 work start position
R1 work route
R3 spare route
R10 target route
P31 start end position
P32 spare position

The invention claimed is:

1. An automatic traveling method comprising:
causing a work vehicle to travel automatically along a target route in a work site;
autonomously executing, during automatic travel of the work vehicle, temporary stop processing to stop travel of the work vehicle at a current position while the work vehicle remains running such that travel of the work vehicle can be resumed when a temporary stop condition is satisfied; and
executing stop reservation processing to cause the work vehicle to travel and thereafter stop the work vehicle in a state where the travel of the work vehicle can be resumed when a stop reservation condition is satisfied during the automatic travel of the work vehicle.

2. The automatic traveling method according to claim 1, further comprising:
executing emergency stop processing to stop the work vehicle at the current position in a mode in which the travel of the work vehicle cannot be resumed when an emergency stop condition is satisfied during the automatic travel of the work vehicle.

3. The automatic traveling method according to claim 1, wherein:
the work site includes:
a work area where the work vehicle performs work; and
a non-work area where the work vehicle does not perform the work, and
in the stop reservation processing, when the stop reservation condition is satisfied in the work area, the work vehicle travels to the non-work area and is thereafter stopped.

4. The automatic traveling method according to claim 3, wherein, in the stop reservation processing, in a case where the work vehicle travels to the non-work area and is thereafter stopped, the work vehicle is stopped at a position that corresponds to a work start position at a time of resuming the travel in the work area.

5. The automatic traveling method according to claim 1, wherein the work site includes a work area where the work vehicle performs work and a non-work area where the work vehicle does not perform the work, the method further comprising:
setting a stop prohibition area where the work vehicle is not stopped in the work area in the stop reservation processing.

6. The automatic traveling method according to claim 1, further comprising:
making a notification in conjunction with the stop reservation processing.

7. The automatic traveling method according to claim 6, wherein the notification is made in at least one of a first time point at which the stop reservation condition is satisfied, a second time point at which the work vehicle is stopped, and a period from the first time point to the second time point.

8. The automatic traveling method according to claim 1, further comprising:
outputting which of plural conditions included in the stop reservation conditions is satisfied.

9. The automatic traveling method according to claim 1, wherein:
the target route includes: a work route on which the work vehicle performs work on a work target; and a spare route that is set from a spare position in front of a start end position of the work route to the start end position, and
the work vehicle starts the work on the spare route.

10. The automatic traveling method according to claim 1, wherein the temporary stop processing is autonomously executed when:

an amount of a fluid used by the work vehicle falls below a threshold; or a location of the work vehicle deviates from a target route.

11. A non-transitory, computer-readable medium storing instructions that, when executed by one or more processors, cause the one or more processors to execute the automatic traveling method according to claim 1.

12. An automatic traveling system comprising:

an automatic travel processing unit configured to cause a work vehicle to travel automatically along a target route in a work site, and wherein the automatic travel processing unit is configured to autonomously execute:

temporary stop processing, during automatic travel of the work vehicle, to stop travel of the work vehicle at a current position while the work vehicle remains running such that travel of the work vehicle can be resumed when a temporary stop condition is satisfied; and stop reservation processing to cause the work vehicle to travel and thereafter stop the work vehicle in a state where the travel of the work vehicle can be resumed when a stop reservation condition is satisfied during the automatic travel of the work vehicle.

13. A work vehicle comprising:

the automatic traveling system according to claim 12; and a travel unit that is configured to be controlled by the automatic traveling system.

\*  \*  \*  \*  \*